US012605761B2

(12) United States Patent
Lee et al.

(10) Patent No.: US 12,605,761 B2
(45) Date of Patent: Apr. 21, 2026

(54) MAGNETIC PLASMONIC PARTICLES AND STRUCTURE COMPRISING SAME

(71) Applicant: The Industry & Academic Cooperation in Chungnam National University (IAC), Daejeon (KR)

(72) Inventors: Jae Beom Lee, Hwaseong-si (KR); Ki Jae Jeong, Busan (KR)

(73) Assignee: The Industry & Academic Cooperation in Chungnam National University (IAC), Daejeon (KR)

( * ) Notice: Subject to any disclaimer, the term of this patent is extended or adjusted under 35 U.S.C. 154(b) by 902 days.

(21) Appl. No.: 17/775,858

(22) PCT Filed: Nov. 4, 2020

(86) PCT No.: PCT/KR2020/015355
§ 371 (c)(1),
(2) Date: May 10, 2022

(87) PCT Pub. No.: WO2021/096154
PCT Pub. Date: May 20, 2021

(65) Prior Publication Data
US 2022/0388061 A1 Dec. 8, 2022

(30) Foreign Application Priority Data
Nov. 12, 2019 (KR) ........................ 10-2019-0144029

(51) Int. Cl.
*B22F 1/07* (2022.01)
*B22F 1/00* (2022.01)
(Continued)

(52) U.S. Cl.
CPC .................. *B22F 1/00* (2013.01); *B22F 1/07* (2022.01); *B22F 9/24* (2013.01); *B82B 1/007* (2013.01); *B82B 3/0061* (2013.01); *B82Y 40/00* (2013.01)

(58) Field of Classification Search
None
See application file for complete search history.

(56) References Cited

U.S. PATENT DOCUMENTS

2002/0177143 A1 11/2002 Mirkin et al.
2013/0071882 A1 3/2013 Wang et al.
(Continued)

FOREIGN PATENT DOCUMENTS

JP 2016153519 A 8/2016
KR 20170051214 A 5/2017
KR 101782265 B1 9/2017

OTHER PUBLICATIONS

English translation of Maenozono et al. (JP 2016-153519) (Year: 2016).*
(Continued)

*Primary Examiner* — Ronak C Patel
(74) *Attorney, Agent, or Firm* — STIP Law Group, LLC

(57) ABSTRACT
As a magnetoplasmonic particle that can have physical reactability, that is, arrangement variability to a magnetic field to implement an immediate self-assembly property, can be manufactured as a three-dimensional structure through a significantly simplified process compared to the conventional one based on this arrangement variability due to the application of the magnetic field, can be used in various technical fields because an additional change or adjustment of a geometrical of this three-dimensional structure is easy, there is provided the magnetoplasmonic particle including a core-shell particle including a core and a shell surrounding at least a part of a surface of the core and including a
(Continued)

component different from a component of the core, and having the arrangement variability due to the application of the magnetic field.

5 Claims, 10 Drawing Sheets

(51) Int. Cl.
*B22F 9/24* (2006.01)
*B82B 1/00* (2006.01)
*B82B 3/00* (2006.01)
*B82Y 40/00* (2011.01)

(56) References Cited

U.S. PATENT DOCUMENTS

2013/0228716 A1* 9/2013 Suetsuna ............ H01F 1/15333
427/127
2016/0343487 A1* 11/2016 Kandapallil .............. C25B 3/13

OTHER PUBLICATIONS

English translation of Sato et al. (JP 2016-108635). (Year: 2016).*
International search report of PCT/KR2020/015355, Jan. 29, 2021, English translation.

* cited by examiner

[FIG. 1 (a)]
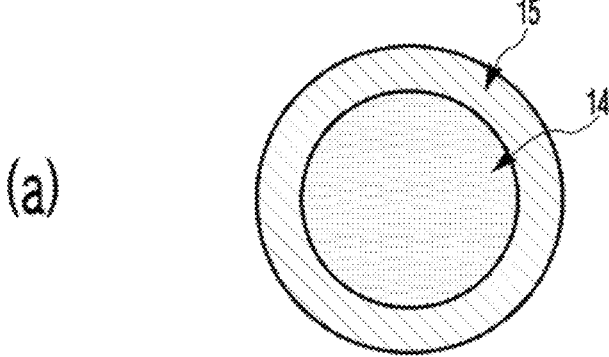
[FIG. 1(b)]
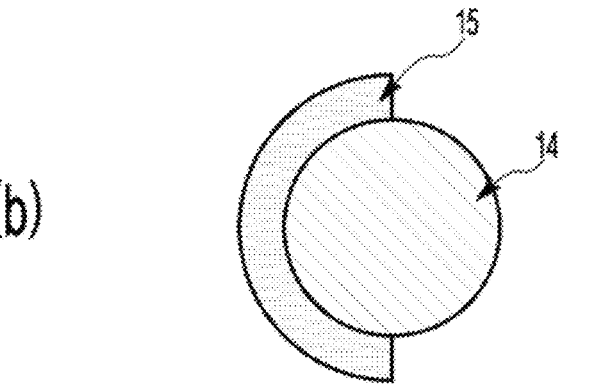
[FIG. 1(c)]
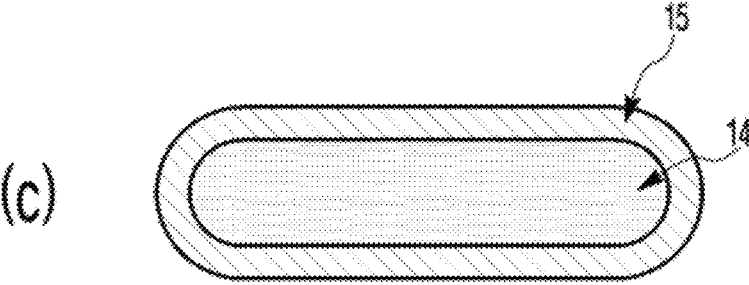

[FIG. 2]
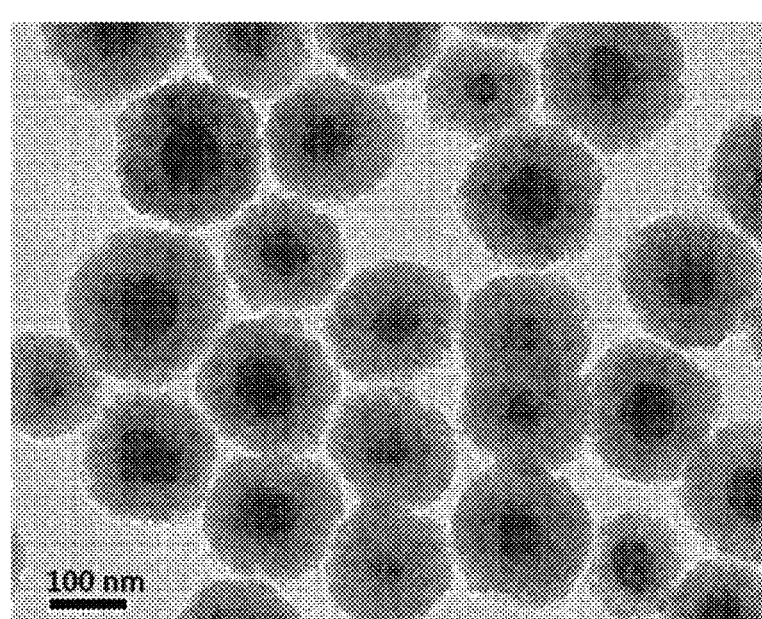
[FIG. 3]
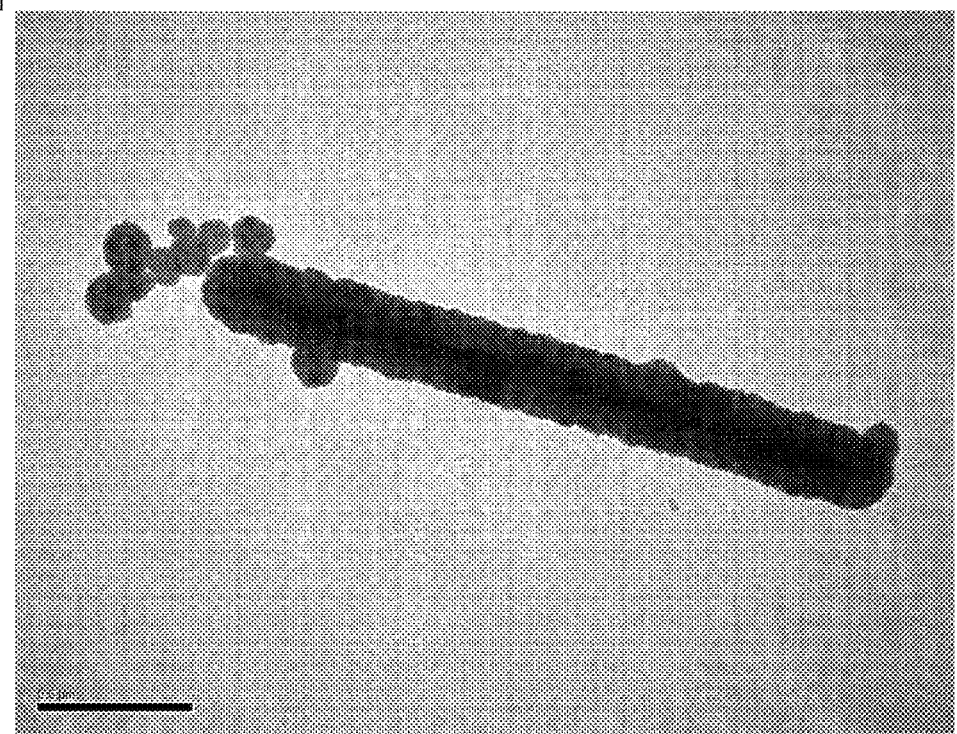

[FIG. 4]
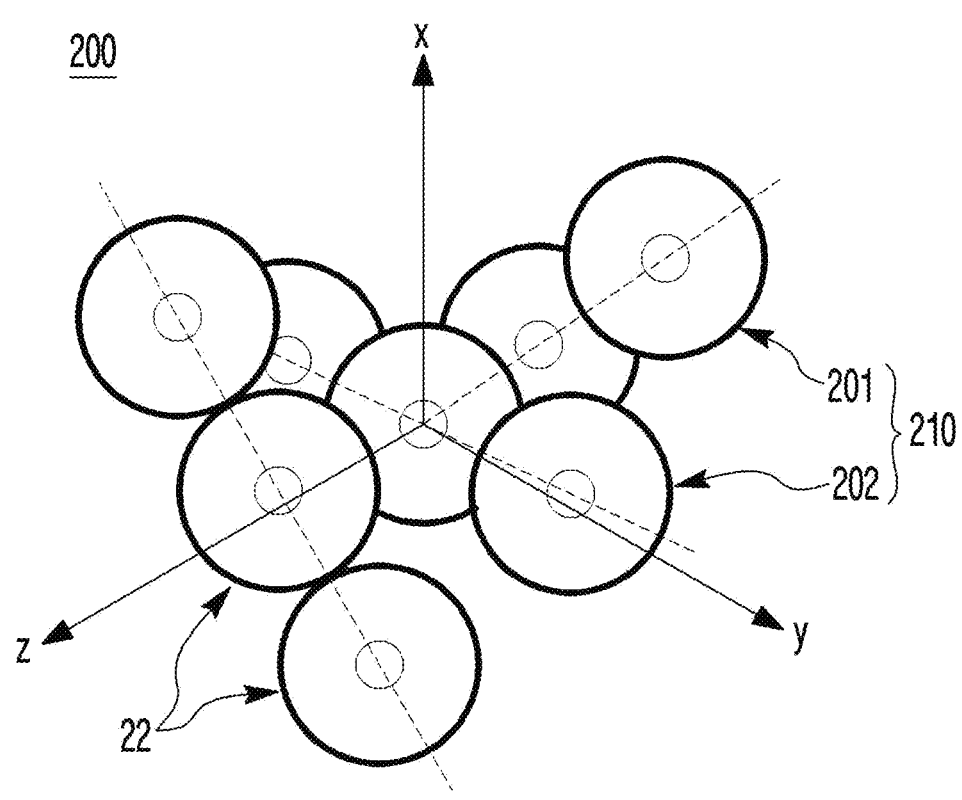

[FIG. 5]
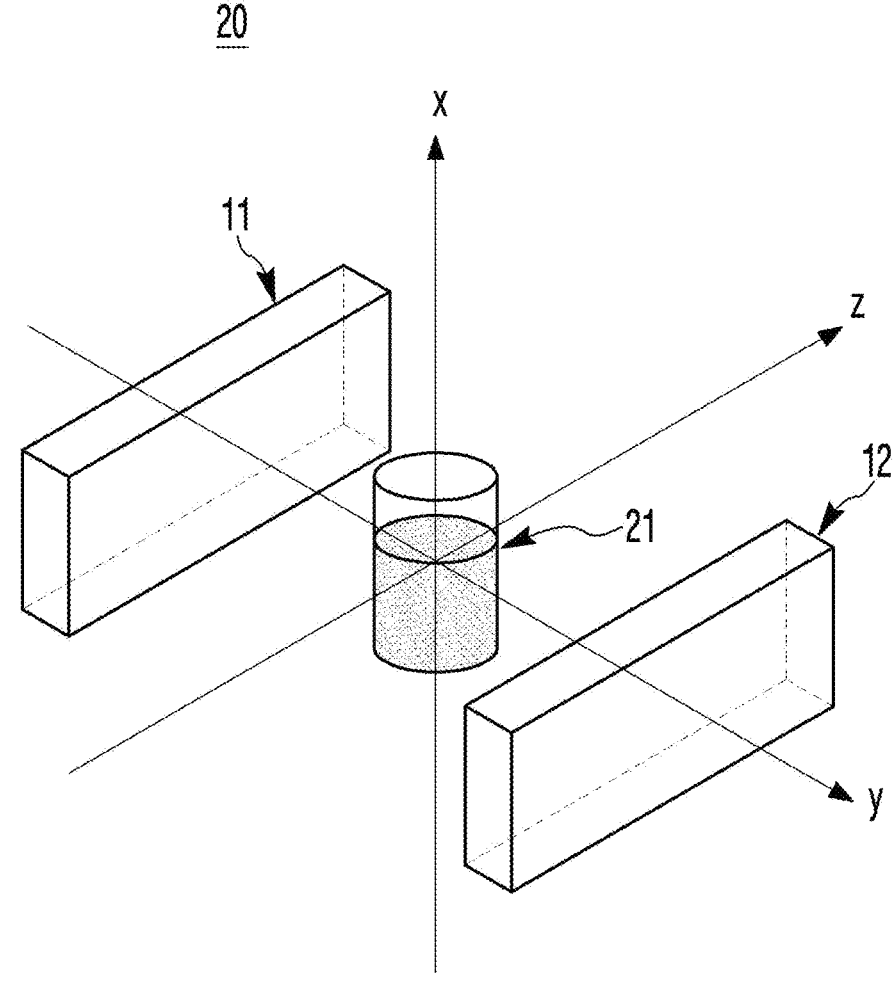

[FIG. 6]
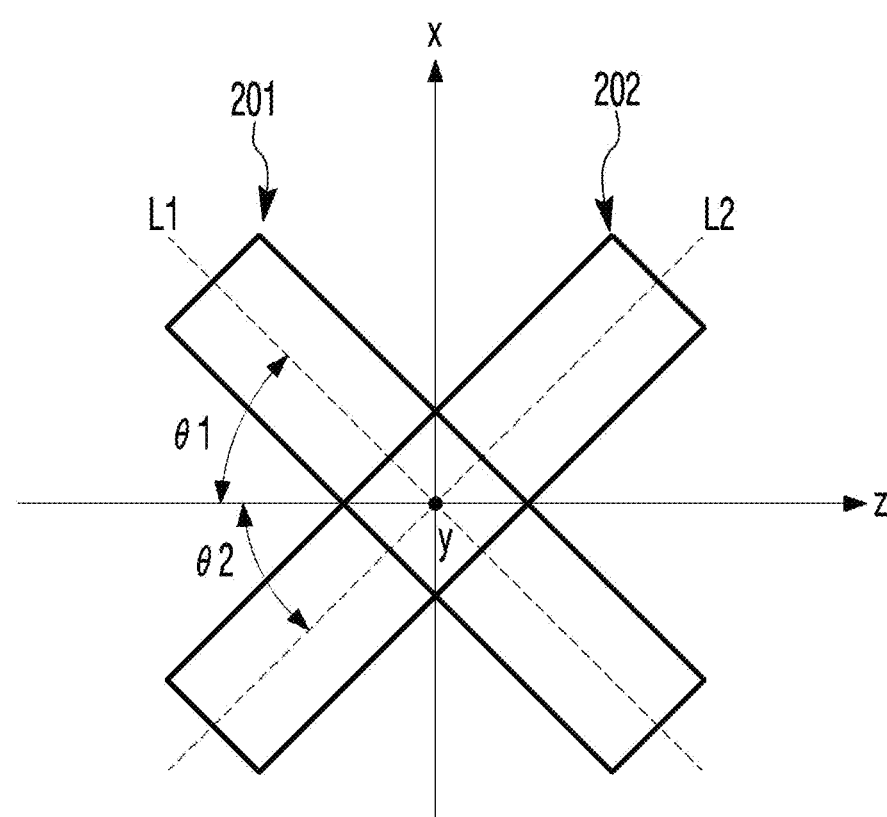

[FIG. 7]
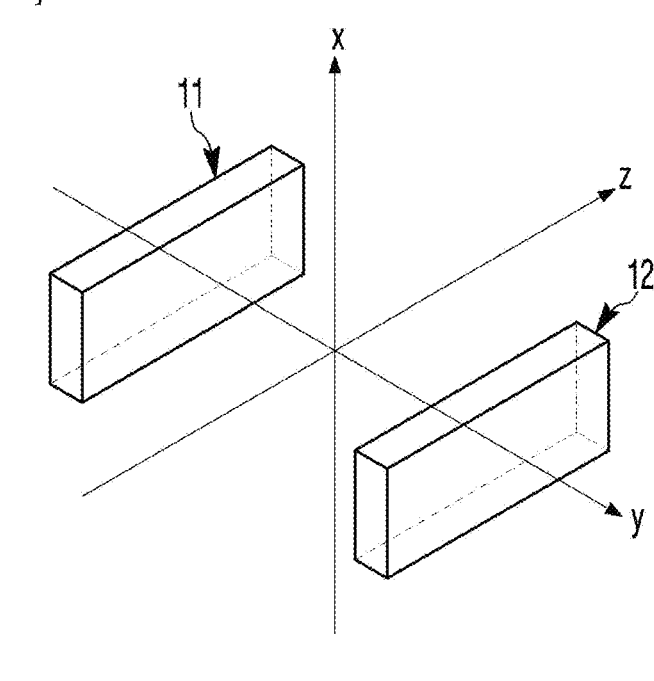
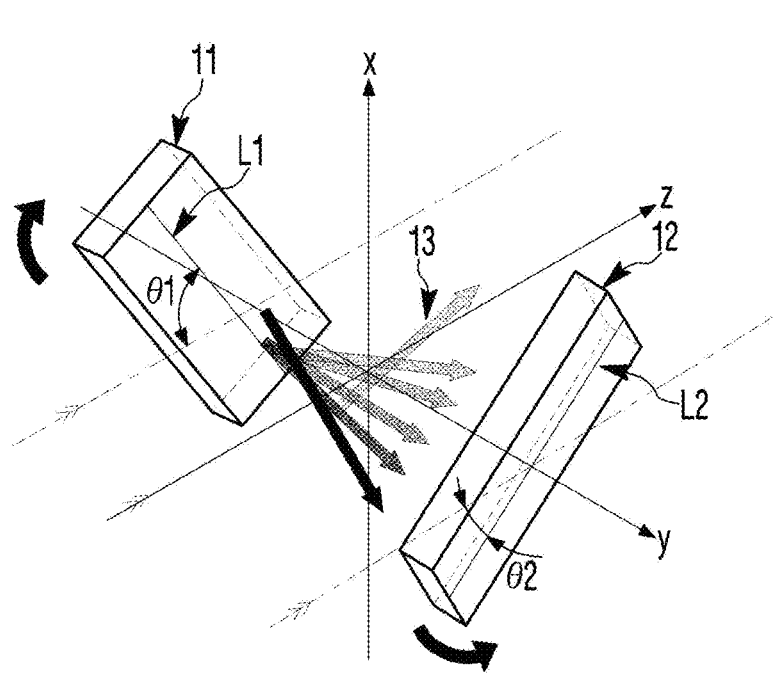

[FIG. 8]
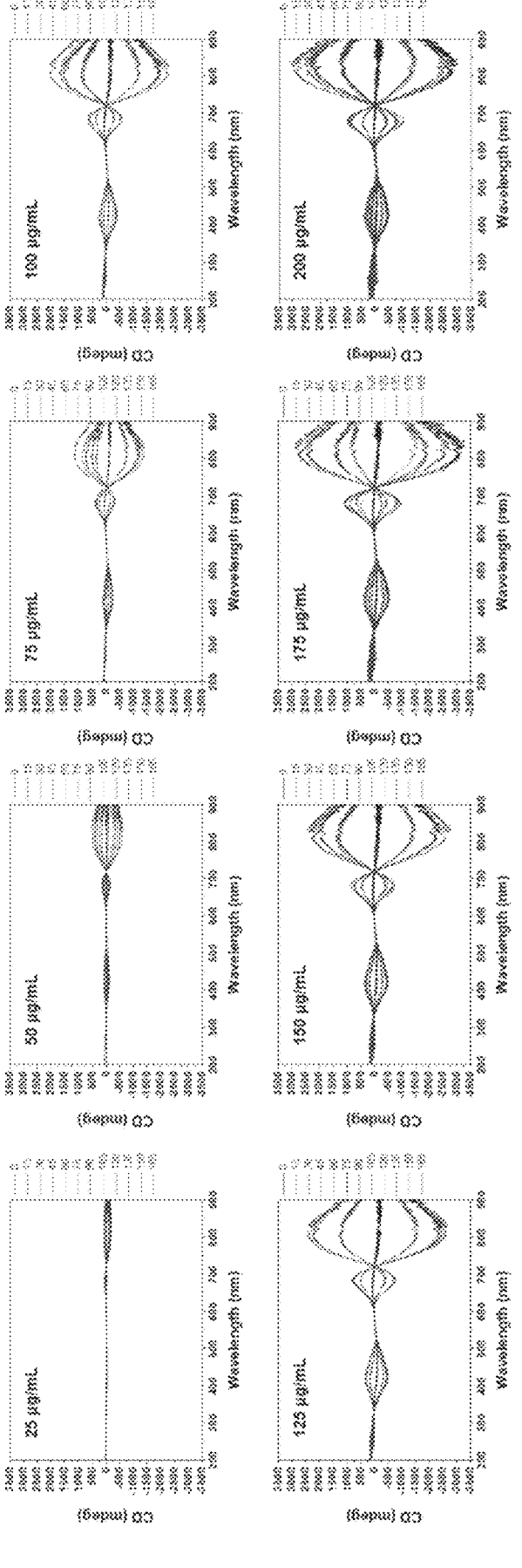

[FIG. 9]
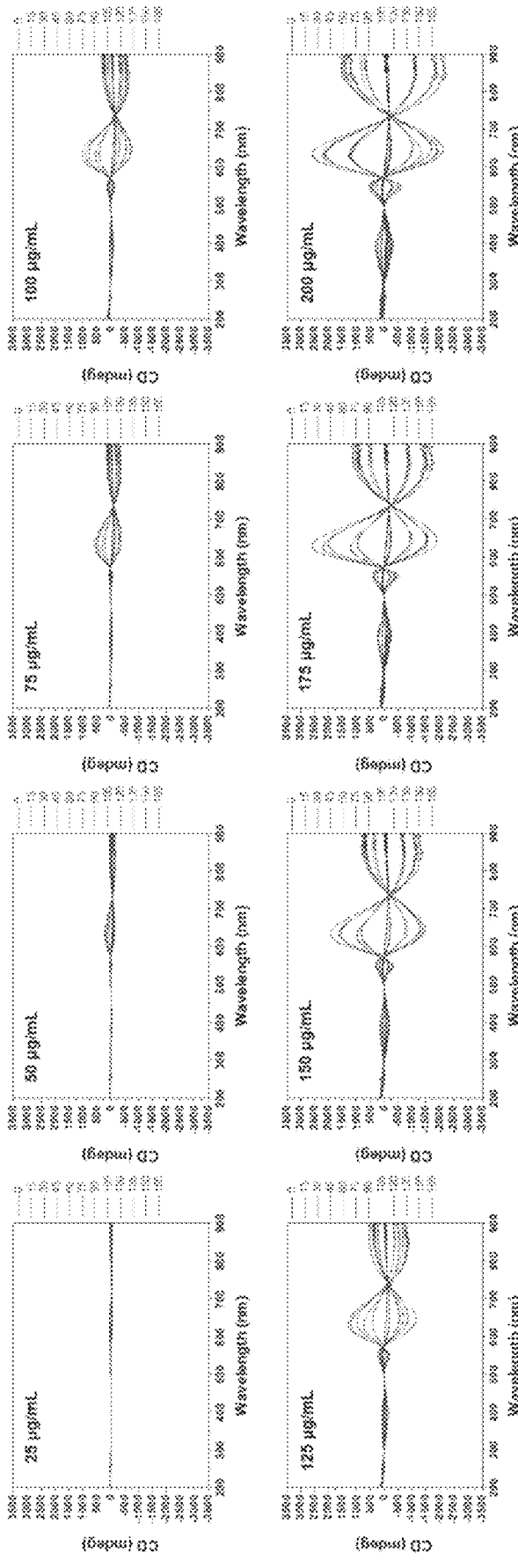

[FIG. 10]
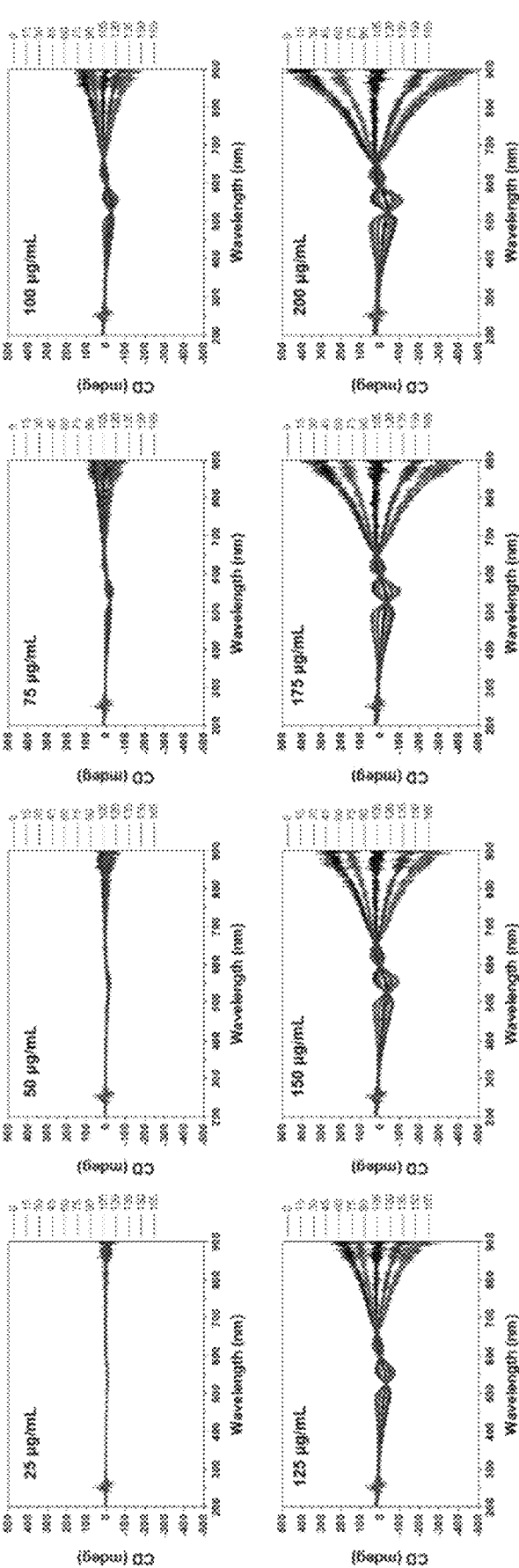

[FIG. 11]
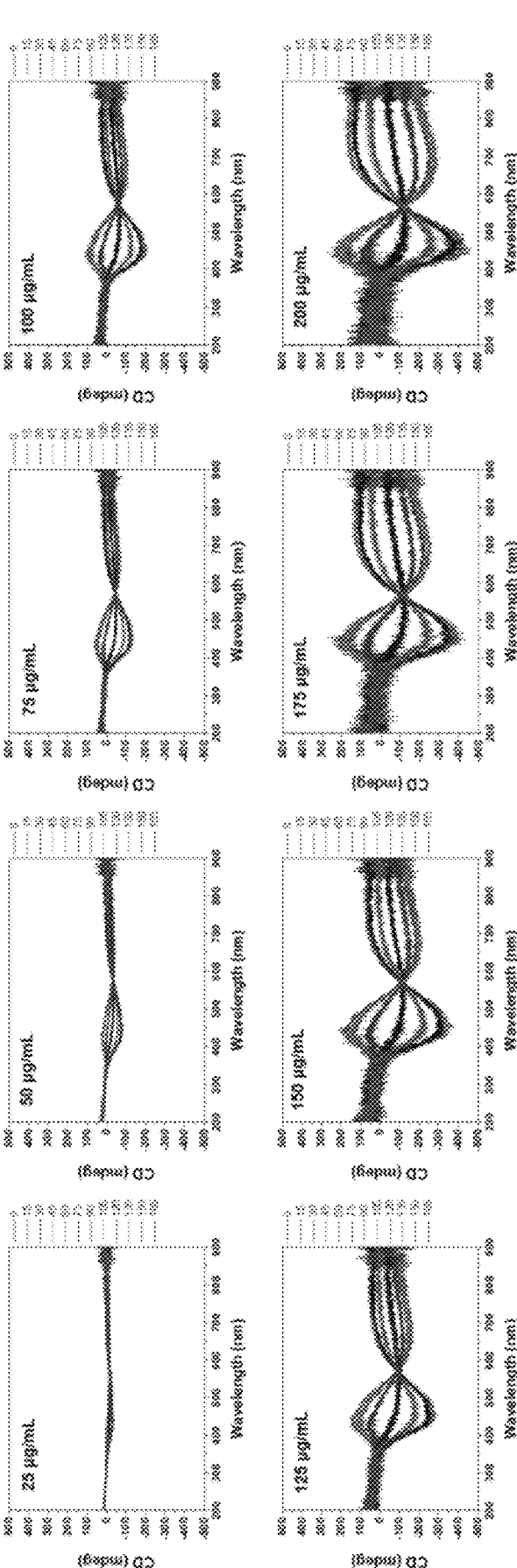

MAGNETIC PLASMONIC PARTICLES AND STRUCTURE COMPRISING SAME

CROSS-REFERENCE TO RELATED APPLICATIONS

This application is the U.S. National Phase under 35 U.S.C. § 371 of International Application No. PCT/KR2020/015355 filed on Nov. 4, 2020, which in turn claims the benefit of Korean Application No. 10-2019-0144029 filed on Nov. 12, 2019, the disclosures of which are incorporated by reference into the present application.

TECHNICAL FIELD

The present disclosure relates to particles having plasmon properties and magnetic properties at the same time and a structure including the same, and provides nanoparticles that may be widely applied to various technical fields based on the structure and composition thereof.

BACKGROUND ART

With the continuous development of synthesis technology, it is possible to manufacture nano-sized particles using a metal, and it has been found that these nanoparticles have various and unique properties due to the advancement of analysis technology. These nanoparticles may be used in various technical fields, such as optics, biotechnology, and catalysts, as themselves or a three-dimensional structure consisting of the nanoparticles according to their compositions and structures. In addition, as the field of nano-science has recently been spotlighted as a new next-generation industrial field, the demand for nanoparticles of various compositions and structures is increasing. Research on synthesizing the three-dimensional structure using nanoparticles of specific compositions and structures is being actively conducted in line with this technological trend, and a chemical synthesis method is being mainly used. For example, recently, a method of synthesizing the three-dimensional structure using a peptide to which two or more amino acids are bound has been proposed. In addition, a method using the e-beam lithography, a hole lithography method using nano-sized holes to perform rotational deposition, etc. are being studied. However, the conventional nanoparticles and synthesis of structures using the same have the complicated process and slightly insufficient precision and accuracy. Accordingly, the present inventors studied particles that may be applied to a simpler structure synthesis process and may greatly improve the accuracy and precision of processing in the compositions and structures of nanoparticles, and completed the present disclosure.

SUMMARY OF INVENTION

Technical Problem

An object of one embodiment of the present disclosure is to provide magnetoplasmonic particles that have immediate self-assembly property by having physical reactivity to a magnetic field, that is, arrangement variability. In addition, another object of the present disclosure is to provide magnetoplasmonic particles that may be manufactured as a three-dimensional structure through a significantly simplified process compared to the conventional technology based on arrangement variability due to the application of a magnetic field, and used in various technical fields because it is easy to additionally change or adjust a geometric structure of this three-dimensional structure.

Solution to Problem

According to one embodiment of the present disclosure, there is provided a magnetoplasmonic particle including a core-shell particle including a core; and a shell surrounding at least a part of a surface of the core, and containing a component different from that of the core, and having arrangement variability due to the application of a magnetic field.

The core-shell particle may include a spherical core-shell particle or a rod-shaped core-shell particle.

The spherical core-shell particle may have a diameter of the core of 0.01 nm to 300 nm, a thickness of the shell of 1 nm to 150 nm, and an aspect ratio of 1.00 to 2.00 defined as a ratio (L/S) of a long diameter (L) and a short diameter (S) of the core.

The rod-shaped core-shell particle may have a width of the core of 0.01 nm to 100 nm, a thickness of the shell of 1 nm to 150 nm, and an aspect ratio of more than 2.00 and 40.00 or less defined as a ratio (L/W) of a length (L) and a width (W) of the core.

For the core-shell particle, any one of the core and the shell may contain a magnetic component, and the other may contain a metal component.

The magnetic component may contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

The metal component may contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd) and combinations thereof.

The arrangement variability due to the application of the magnetic field to the magnetoplasmonic particle may include arrangement variability due to the application of a spiral magnetic field.

The core-shell particle may include a spherical core-shell particle, and the spherical core-shell particle may have a standard deviation of the particle diameter of the core of 20 or less with respect to a powder of 1 mg.

The core-shell particle may include a rod-shaped core-shell particle, and the rod-shaped core-shell particle may have a standard deviation of the width of the core of 20 or less with respect to a powder of 1 mg.

The magnetoplasmonic particle may form a particle arrangement structure by changing the arrangement when the magnetic field is applied by the arrangement variability due to the application of the magnetic field, and a nano-structure including at least one of the particle arrangement structures may have chirality in the overall structure.

At this time, the applied magnetic field may be a spiral magnetic field.

In another embodiment of the present disclosure, there is provided a chiral nano-structure including two or more nanoparticle arrangement structures, in which the nanoparticle arrangement structure includes a first structure including at least one nanoparticle; and a second structure including at least one nanoparticle, and disposed to be spaced apart from the first structure, the nanoparticle includes a magnetoplasmonic particle, and the entire structure has chirality.

The chirality of the chiral nano-structure may have the variable characteristic by applying the spiral magnetic field.

For the chiral nano-structure, a time (T2–T1) from a time point (T1) at which the spiral magnetic field is applied to a time point (T2) at which a change is completed to have chirality corresponding to the applied spiral magnetic field may be 0.01 ms to 20 ms.

A separation straight distance between the first structure and the second structure may be 0.01 nm to 50 μm.

Advantageous Effects of Invention

The magnetoplasmonic particles can implement the immediate self-assembly property by having the physical reactivity to the magnetic field, that is, the arrangement variability. In addition, the magnetoplasmonic particles can be manufactured as the three-dimensional structure through the significantly simplified process compared to the conventional technology based on the arrangement variability due to the application of a magnetic field, and used in various technical fields because it is easy to additionally change or adjust the geometric structure of this three-dimensional structure.

BRIEF DESCRIPTION OF DRAWINGS

FIG. 1(*a*), FIG. 1(*b*) and FIG. 1(*c*) schematically show a cross section of magnetoplasmonic particles according to one embodiment.

FIG. 2 is a photograph showing spherical core-shell particles according to one embodiment.

FIG. 3 is a photograph showing rod-shaped core-shell particles according to one embodiment.

FIG. 4 is a perspective diagram schematically showing a part of the nano-structure according to one embodiment.

FIG. 5 schematically shows the arrangement of each component in Measurement Example for evaluating variability by the application of magnetic field to the magnetoplasmonic particles.

FIG. 6 schematically shows a perspective diagram in one direction of rotation of a magnetic substance for applying the magnetic field in Measurement Example for evaluating variability due to the application of a magnetic field to the magnetoplasmonic particles.

FIG. 7 schematically shows a process in which a spiral magnetic field is applied in Measurement Example for evaluating the variability due to the application of a magnetic field to the magnetoplasmonic particles.

FIG. 8 shows circular dichroism spectroscopy (CD) for each concentration and rotation angle of a nano-structure manufactured using the magnetoplasmonic particles of Example 1.

FIG. 9 shows circular dichroism spectroscopy (CD) for each concentration and rotation angle of a nano-structure manufactured using the magnetoplasmonic particles of Example 2.

FIG. 10 shows circular dichroism spectroscopy (CD) for each concentration and rotation angle of a nano-structure manufactured using the magnetoplasmonic particles of Example 3.

FIG. 11 shows circular dichroism spectroscopy (CD) for each concentration and rotation angle of a nano-structure manufactured using the magnetoplasmonic particles of Example 4.

DESCRIPTION OF EMBODIMENTS

According to one embodiment of the present disclosure, there is provided a magnetoplasmonic particle including a core-shell particle including a core; and a shell surrounding at least a part of a surface of the core, and containing a component different from that of the core, and having arrangement variability due to the application of a magnetic field.

In another embodiment of the present disclosure, there is provided a chiral nano-structure including two or more nanoparticle arrangement structures, in which the nanoparticle arrangement structure includes a first structure including at least one nanoparticle; and a second structure including at least one nanoparticle, and disposed to be spaced apart from the first structure, the nanoparticle includes a magnetoplasmonic particle, and the entire structure has chirality.

Advantages and features of the present disclosure, and a method for achieving them will become apparent with reference to the embodiments described below. However, the present disclosure is not limited to the embodiments disclosed below but can be implemented in various different forms, and only the present embodiment serves to complete the disclosure of the present disclosure, and to fully inform those skilled in the art to which the present disclosure pertains of the scope of the disclosure, and the present disclosure is only defined by the scope of the claims.

In the drawings of the present specification, a thickness is shown to be enlarged to clearly show various layers and regions. In addition, in the drawings, for convenience of explanation, thicknesses of some layers and regions are shown to be exaggerated. The same reference numerals refer to the same components throughout the specification.

In this specification, the meaning of 'or more' is interpreted as including the corresponding number or more cases. For example, 'two or more' means two or two or more cases. In addition, the description of 'X to Y' for a numerical range is interpreted as a range including X or Y. For example, '25 to 50' means a numerical range including 25 and 50.

Hereinafter, embodiments according to the present disclosure will be described in detail.

According to one embodiment of the present disclosure, provided are magnetoplasmonic particles that include a core-shell particle including a core; and a shell surrounding at least a part of a surface of the core and containing a component different from a component of the core, and have arrangement variability due to the application of a magnetic field.

The plasmon refers to a phenomenon in which free electrons inside a metal vibrate collectively. For metal nanoparticles, plasmon may exist locally on the surface, which may be referred to as a surface plasmon. When the metal nanoparticles meet an electric field of light in a range from visible ray to near-infrared ray, the metal nanoparticles have vivid colors because light absorption is caused by surface plasmon resonance (SPR). The magnetoplasmonic particles are plasmon particles having magnetism, and may be aligned in a predetermined arrangement in a magnetic field by magnetism, and colored by a plasmon phenomenon at the same time.

The magnetoplasmonic particles have arrangement variability due to the application of a magnetic field. The 'arrangement variability due to the application of a magnetic field' refers to a characteristic in which the magnetoplasmonic particles are aligned in a predetermined arrangement according to the applied magnetic field when the magnetic field is applied to the magnetoplasmonic particles. Based on this arrangement variability, a three-dimensional structure having a predetermined alignment structure including the magnetoplasmonic particles may be manufactured by a relatively simple means of applying a magnetic field.

Meanwhile, according to another embodiment of the present disclosure, provided is a chiral nano-structure that includes two or more nanoparticle arrangement structures, the nanoparticle arrangement structure including a first structure including at least one nanoparticle; and a second structure including at least one nanoparticle and disposed to be spaced apart from the first structure, and has the entire structure having chirality.

Chirality refers to the property of asymmetry. The particle structure having structural chirality may be usefully applied to an optical technology field such as a liquid crystal display (LCD) or a bio field such as pharmaceuticals. The chiral nano-structure can implement a high level of chiral modulation performance through simple structural processing and deformation. The chiral modulation performance can implement very high performance in the field of nano-science requiring an immediate and fast reaction speed.

In one embodiment, the chirality of the nano-structure may have a variable property by applying a spiral magnetic field. The chirality of the nano-structure is derived from the overall structural characteristics of the nano-structure. The structural characteristics of the nano-structure can be immediately and quickly deformed by a relatively simple means of applying the spiral magnetic field, and as a result, it is possible to secure variability in which the chirality of the nano-structure is changed immediately and quickly.

For example, for the nano-structure, a time (T2-T1) from a time point (T1) at which the spiral magnetic field is applied to a time point (T2) at which the structural change is completed to have chirality corresponding to the chirality of the applied spiral magnetic field may be from about 0.01 ms to about 20 ms, for example, from about 0.01 ms to about 10 ms. This shows a significantly faster reaction rate than the conventional chiral modulation function using a template and the like, and can be applied to various industrial fields such as medicine and optics to implement excellent functions.

FIG. 1 schematically shows a cross section of magnetoplasmonic particles according to one embodiment. Referring to FIG. 1, the magnetoplasmonic particle may be a core-shell particle including a core 14 and a shell 15. The shell 15 may surround at least a part of a surface of the core 14, and contain a component different from that of the core 14. The meaning that the shell contains the component different from the component of the core should be interpreted as containing a case in which the entire composition is different even when not only all components are different from each other but also some contain the same component.

In one embodiment, in the core-shell particle, any one of the core 14 and the shell 15 contains a magnetic component, and the other contains a metal component. Through a combination of the core 14 containing the magnetic component and the shell 15 containing the metal component; or the shell 15 containing the magnetic component and the core 14 containing the metal component, it is possible to immediately and quickly implement arrangement variability due to the application of a magnetic field to the magnetoplasmonic particle, and it can be advantageous to secure the technical advantages in expressing desired colors.

The metal component may contain, for example, one selected from the group consisting of, for example, silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

The magnetic component may contain one selected from the group consisting of, for example, iron oxide ($Fe_3O_4$), nickel oxide (NiO), cobalt oxide ($Co_3O_4$), iron (Fe), nickel (Ni), cobalt (Co), and combinations thereof.

In one embodiment, the core may contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof, and the shell may contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

In another embodiment, the core may contain one selected from the group consisting of iron oxide ($Fe_3O_4$), nickel oxide (NiO), cobalt oxide ($Co_3O_4$), iron (Fe), nickel (Ni), cobalt (Co), and combinations thereof, and the shell may contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

The core-shell particle may include a spherical core-shell particle or a rod-shaped core-shell particle. In other words, the core-shell particle may be composed of only the spherical core-shell particle, only the rod-shaped core-shell particle, or a combination of the spherical core-shell particle and the rod-shaped core-shell particle.

In one embodiment, the core-shell particle may include the spherical core-shell particle. Referring to (a) and (b) of FIG. 1, the core-shell particle may include a core-shell particle having a spherical three-dimensional shape. As shown in (a) of FIG. 1, the spherical core-shell particle may also have a structure including the core 14 and the shell 15 surrounding substantially the entire surface thereof, and as shown in (b) of FIG. 1, the spherical core-shell particle may also have a half-shell structure including the core 14 and the shell 15 surrounding a part of the surface thereof.

In the present specification, the term 'spherical' may be interpreted as including not only a case in which a cross section of the spherical core-shell particle is a geometrically perfect circular shape but also a range that may be recognized as a shape of sphere in the entire three-dimensional structure within a predetermined error range even when the spherical core-shell particle has an oval shape.

In this specification, it may be understood that the meaning of 'half-shell' collectively refers to not only a case in which the shell 15 surrounds exactly half of a surface area of the core 14, but also a case in which the shell 15 surrounds at least a part thereof instead of the whole.

In one embodiment, the core-shell particle may include the rod-shaped core-shell particle. Referring to (c) of FIG. 1, the core-shell particle may include a three-dimensional rod-shaped core-shell particle. As in the spherical core-shell particle, the rod-shaped core-shell particle may also have a structure including the core 14 and the shell 15 surrounding substantially the entire surface thereof, and also have a half-shell structure (not shown) including the shell 15 surrounding at least a part of the surface of the core 14.

In the present specification, it may be understood that the term 'rod-shaped' collectively refers to a shape in which a length and a width form a predetermined aspect ratio with respect to its cross section, and encompass all three-dimensional shapes in which a ratio of the length to the width exceeds 2.00.

In one embodiment, the core-shell particle may include the spherical core-shell particle or the rod-shaped core-shell particle, in which the spherical core-shell particle or the rod-shaped core-shell particle may include the core 14; and the shell 15 surrounding the entire surface of the core and containing the component different from the component of the core, the core 14 may contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), and combinations thereof, and the shell 15 may contain one selected from the group consisting of iron oxide ($Fe_3O_4$), nickel oxide (NiO), cobalt oxide ($Co_3O_4$), iron (Fe), nickel (Ni), cobalt (Co), and combinations thereof.

For example, the core 14 may contain silver (Ag), gold (Au), or combinations thereof, and the shell 15 may contain iron oxide ($Fe_3O_4$). The magnetoplasmonic particle may have the core-shell structure including this combination of components and thus be aligned in a precisely designed arrangement under a magnetic field application condition, and as a result, it can be more advantageous in forming a desired three-dimensional structure.

In another embodiment, the core-shell particle may include the spherical core-shell particle or the rod-shaped core-shell particle, in which the spherical core-shell particle or the rod-shaped core-shell particle may include the core 14 and the half-shell 15 surrounding a part of the surface of the core and containing the component different from the component of the core 14, the core 14 may contain one selected from the group consisting of iron oxide ($Fe_3O_4$), oxide nickel (NiO), cobalt oxide ($Co_3O_4$), iron (Fe), nickel (Ni), cobalt (Co), and combinations thereof, and the shell 15 may contain one selected from the group consisting of silver (Ag), Gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

For example, the core 14 may contain iron oxide ($Fe_3O_4$), and the shell 15 may contain silver (Ag), gold (Au), or combinations thereof. The magnetoplasmonic particle may have the core-shell structure including this combination of components and thus be aligned in a precisely designed arrangement under a magnetic field application condition, and as a result, it can be more advantageous in forming a desired three-dimensional structure.

FIG. 2 shows a photograph of the spherical core-shell particle according to one embodiment, and FIG. 3 shows a photograph of the rod-shaped core-shell particle according to one embodiment.

In one embodiment, the spherical core-shell particle has an average particle diameter of the core 14 of about 0.01 nm to about 300 nm, for example, about 5 nm to about 250 nm, for example, about 5 nm to about 100 nm, for example, about 5 nm to about 90 nm, for example, about 5 nm to about 80 nm, for example, about 20 nm to about 80 nm, for example, about 40 nm to about 80 nm.

An average thickness of the shell 15 of the spherical core-shell particle may be from about 1 nm to about 150 nm, for example, from about 1 nm to about 120 nm, for example, from about 1 nm to about 100 nm, for example, from about 1 nm to about 80 nm, for example, about 5 nm to about 80 nm, for example, about 10 nm to about 80 nm, for example, about 10 nm to about 70 nm, for example, about 20 nm to about 60 nm, for example, about 30 nm to about 60 nm, for example, about 40 nm to about 60 nm.

In the spherical core-shell particle, an aspect ratio defined as a ratio (L/S) of a long diameter (L) and a short diameter (S) of the core 14 with respect to the cross section may be about 1.00 to about 2.00, for example, from about 1.00 to about 1.80, for example, from about 1.00 to about 1.75, for example, from about 1.00 to about 1.70, for example, from about 1.00 to about 1.65, for example, from about 1.00 to about 1.60.

The spherical core-shell particle may have a standard deviation of the particle diameter of the core 14 for a powder of 1 mg amount of about 30 nm or less, for example, about 25 nm or less, for example, about 20 nm to about 10 nm. The magnetoplasmonic particle may be used as a powder, that is, an aggregate including a plurality of particles. At this time, the plurality of magnetoplasmonic particles may be aligned to have a predetermined interval and a relative location relationship with each other under the magnetic field application condition to form the desired three-dimensional structure. As the range of the standard deviation with respect to the amount of powder satisfies the above-described range, it is possible to improve the structural regularity and accuracy of the three-dimensional structure manufactured using the magnetoplasmonic particles, and it can be more advantageous in terms of mass design.

In one embodiment, the rod-shaped core-shell particle may have an average width of the core 14 of about 0.01 nm to about 100 nm, for example, about 5 nm to about 100 nm, for example, about 5 nm to about 90 nm, for example, about 5 nm to about 80 nm, for example, about 20 nm to about 80 nm, for example, about 40 nm to 80 nm.

The average thickness of the shell 15 of the rod-shaped core-shell particle may be from about 1 nm to about 150 nm, for example, from about 1 nm to about 120 nm, for example, from about 1 nm to about 100 nm, for example, from about 1 nm to about 80 nm, for example, about 5 nm to about 80 nm, for example, about 10 nm to about 80 nm, for example, about 10 nm to about 70 nm, for example, about 20 nm to about 60 nm, for example, about 30 nm to about 60 nm, for example, about 40 nm to about 60 nm.

In the rod-shaped core-shell particle, the aspect ratio defined as a ratio (L/W) of a length (L) and width (W) of the core 14 is greater than about 2.00, smaller than or equal to about 40.00, for example, from about 5.00 to about 40.00, for example, from about 10.00 to about 40.00, for example, from about 15.00 to about 35.00.

The rod-shaped core-shell particle may have a standard deviation of the width of the core 14 for a powder of 1 mg amount of about 30 nm or less, for example, about 25 nm or less, for example, about 20 nm to about 10 nm. The magnetoplasmonic particle may be used as a powder, that is, an aggregate including a plurality of particles. At this time, the plurality of magnetoplasmonic particles may be aligned to have a predetermined interval and a relative location relationship with each other under the magnetic field application condition to form the desired three-dimensional structure. As the range of the standard deviation with respect to the amount of powder satisfies the above-described range, it is possible to improve the structural regularity and accuracy of the three-dimensional structure manufactured using the magnetoplasmonic particles, and it can be more advantageous in terms of mass design.

In the structures of the spherical core-shell particle and the rod-shaped core-shell particle, the particle diameter and/or average particle diameter of the core, the width and/or average width of the core, the average thickness of the shell, the long and short diameters of the core, and the length and width of the core are all two-dimensional values measured with respect to the cross section of the particle, and may be obtained from a projection image obtained through a means such as a scanning electron microscope (SEM) or a transmission electron microscope (TEM). In the average particle diameter of the core, the average width of the core, and the average thickness of the shell, the 'average' means 'number average'. In the spherical core-shell particle, for any one core, the longest particle diameter is defined as the major diameter of the core, and the shortest particle diameter is defined as the minor diameter of the core. In the rod-shaped core-shell particle, a relatively long length of the width and the length is referred to as the length of the core, and a relatively short length is referred to as the width of the core with respect to any one core. In the spherical and rod-shaped core-shell particles, the thickness of the shell means a vertical straight distance from an interface between the core and the shell to an outer surface of the shell.

As described above, the magnetoplasmonic particle has arrangement variability due to the application of a magnetic field. The 'arrangement variability due to the application of a magnetic field' refers to a characteristic in which the magnetoplasmonic particles are aligned in a predetermined arrangement according to the applied magnetic field when the magnetic field is applied to the magnetoplasmonic particles. Based on this arrangement variability, a three-dimensional structure having a predetermined alignment structure including the magnetoplasmonic particles may be manufactured by a relatively simple means of applying a magnetic field.

Specifically, in one embodiment, the magnetoplasmonic particle may form a particle arrangement structure when a magnetic field is applied. In addition, in one embodiment, the entire structure of the nano-structure including at least one particle arrangement structure may have chirality. In other words, the magnetoplasmonic particle may serve as one configuration of the nano-structure having chirality.

FIG. 4 is a perspective diagram schematically showing a part of an example of a nano-structure 200. Referring to FIG. 4, a magnetoplasmonic particle 22 may form a particle arrangement structure 210 having a predetermined arrangement by applying a magnetic field. The magnetoplasmonic particle 22 may be aligned in the arrangement corresponding to the applied magnetic field to form the particle arrangement structure 210. In one embodiment, the nano-structure 200 including at least one particle arrangement structure 210 may have chirality in the overall structure.

Referring to FIG. 4, the nano-structure 200 may include at least one particle arrangement structure 210, and specifically, may include two or more. The particle arrangement structure 210 may include a first structure 201 including at least one of the magnetoplasmonic particles 22; and a second structure 202 including at least one of the magnetoplasmonic particles 22 and disposed to be spaced apart from the first structure 201. The first structure 201 and the second structure 202 refer to any two adjacent structures among two or more particle arrangement structures 210. The components and structures of the magnetoplasmonic particle 22 included in the first structure 201 and the magnetoplasmonic particle 22 included in the second structure 202 may be the same or different.

In one embodiment, a separation straight distance between the first structure 201 and the second structure 202 may be in about 0.01 nm to about 50 μm. The separation distance between any two structures can be adjusted in the above range, thereby quickly implementing a chirality variable speed of the nano-structure 200 to a target level, and being applied to the optical or bio field to implement an optimal function.

By applying particles satisfying each of the above-described characteristics as the magnetoplasmonic particle 22, the nano-structure 200 including the same as one configuration may have excellent structural chirality due to the application of a magnetic field. In particular, a precise and immediate structural change is possible even with repeated application of the magnetic field to the nano-structure 200, thereby implementing the effect capable of immediate/real-time adjustment of chirality.

In one embodiment, the magnetic field applied to the magnetoplasmonic particle 22 may be a spiral magnetic field. In other words, the variability due to the application of the magnetic field to the magnetoplasmonic particle 22 may be specifically variability due to the application of the spiral magnetic field. The magnetoplasmonic particle 22 can form a structural arrangement corresponding to a change in arrangement through the change in arrangement due to the spiral magnetic field applied to the magnetoplasmonic particle 22, thereby efficiently acquiring the nano-structure 200 whose entire structure has chirality.

In one embodiment, the nano-structure 200 may be a structure with chirality manufactured by applying the spiral magnetic field to a particle dispersion of non-chirality in which the magnetoplasmonic particle 22 is irregularly distributed. In other words, not only the existing chirality of the nano-structure 200 may be variable by the application of the spiral magnetic field, but also the initial chirality itself may be given by the application of the spiral magnetic field. More specifically, the nano-structure 200 to which the initial chirality is given may be manufactured by disposing the magnetoplasmonic particle 22 within the spiral magnetic field formed between two magnetic substances that relatively rotate dispersed dispersions among dispersion media at a predetermined angle θ.

In one embodiment, the nano-structure 200 may have a form in which two or more particle arrangement structures 210 exist in a solvent or the dispersion medium.

In one embodiment, a value of Equation 1 below of the nano-structure 200 may be about 0 to about 20.

$$\frac{A \times B \times C}{P_{max}} \qquad \text{Equation 1}$$

In Equation 1, A refers to a value of the ratio of the core average particle diameter (nm) to the average thickness (nm) of the shell of the magnetoplasmonic particle; or a value of the ratio of the average width (nm) of the core to the average thickness (nm) of the shell, B refers to a value of the concentration (m/mL) of the magnetoplasmonic particle, C refers to the ratio of the relative chirality size when the size value of chirality τ is 1.0 at the rotation angle θ of the spiral magnetic field of 45°, and the Pmax is an absolute value of the maximum peak value of the circular dichroism spectroscopy under the B and C conditions of the nano-structure satisfying A.

In one embodiment, the value of Equation 1 of the nano-structure may be a result when B refers to any one value of about 25 to about 200 and C refers to any one value of about 0 to about 1.0. When the value of Equation 1 derived from these concentration and angle conditions satisfies the range of about 0 to about 20, it is possible to improve the reliability of the correlation between the value of Equation 1 and the arrangement variability due to the application of the magnetic field to the magnetoplasmonic particle, and greatly improve the structural integrity of the nano-structure in terms of securing chirality.

When the value of Equation 1 does not have to satisfy about 0 to about 20 in all the above-described ranges of B and C, but any one value of B and any one value of C in each of the above-described ranges satisfies a specific value within the range of about 0 to about 20, the chirality of the nano-structure may be an indicator indicating that the desired real-time variability and structural integrity are secured. However, as cases in which the range of the value of Equation 1 satisfies the corresponding range within the above-described ranges of B and C increases, a correlation in which the structural integrity is improved in terms of the real-time variability of the magnetoplasmonic particle arrangement and the chirality of the nano-structure is exhibited.

When the magnetoplasmonic particle is the spherical core-shell particle, A refers to a value of a ratio (D/T) of an average particle diameter (D) of the core to an average thickness (T) of the shell. When the magnetoplasmonic particle is the rod-shaped core-shell particle, A refers to a value of the ratio (W/T) of the average width (W) of the core to the average thickness (T) of the shell.

B refers to a value of the concentration (μg/mL) of the magnetoplasmonic particle in the nano-structure. As described above, the nano-structure may have a form existing in a solvent or a dispersion medium, that is, may be in a kind of colloidal solution state. B may be defined as the value of the concentration (μg/mL) of the magnetoplasmonic particle in this colloidal solution. Specifically, when a nano-structure to which the initial chirality is given is manufactured from the non-chiral particle dispersion in which the magnetoplasmonic particle is irregularly dispersed; and when a magnetic field is applied to give different chirality to the nano-structure having the existing chirality, B may be defined as the value of the concentration (μg/mL) of the magnetoplasmonic particle in the solution.

C refers to the ratio of relative chirality size for the size value of the chirality τ of 1.0 when the rotation angle θ of the spiral magnetic field applied to the magnetoplasmonic particle is 45°. For example, the spiral magnetic field may be formed by disposing two magnetic substances to face each other and then relatively rotating them by the same angle, and the rotation angle θ may mean a rotation angle θ of each of the two magnetic substances relatively rotating to form the spiral magnetic field. Specifically, the size of the chirality τ of the spiral magnetic field may be proportional to the size value of sin(2θ). For example, the ratio of the relative size of the chirality when each rotation angle θ of the two magnetic substances is 15° and 165° is 0.5 based on the size of the chirality τ of 1.0 when the rotation angle θ of the spiral magnetic field is 45°.

Pmax is the maximum peak value (mdeg) when the circular dichroism spectroscopy was measured for the nano-structure manufactured based on the arrangement variability due to the application of the magnetic field to the magnetoplasmonic particle by having the magnetoplasmonic particle as one configuration. For example, when two or more peaks are derived from different wavelength regions, it means a value of one peak having the greatest absolute value of the peak value. Pmax is an absolute value and is represented as a positive (+) value.

With respect to the nano-structure formed by having the magnetoplasmonic particle as one configuration, when the value of Equation 1 satisfies about 0 to about 20, it is possible to implement the effect that the modulation rate of chirality is much faster than that of the conventional one, and implement the self-assembly property substantially changed in real time.

In one embodiment, when the magnetoplasmonic particle includes the spherical core-shell particle and the shell has a structure substantially surrounding the entire surface of the core, the value of Equation 1 is about 0 to about 3.0, for example, from about 0 to about 2.5, for example, from about 0 to about 1.5, for example, from about 0 to about 1.0. At this time, for example, the magnetoplasmonic particle may include the core-shell particle provided with the core including the metal component; and the shell including the magnetic component.

When the magnetoplasmonic particle includes the spherical core-shell particle, the shell has a structure substantially surrounding the entire surface of the core, and C refers to any one value greater than zero, the value of Equation 1 may be from about 0.01 to about 3.5, for example, from about 0.01 to about 3.0, for example, from about 0.01 to about 2.5, for example, from about 0.01 to about 1.5, for example, from about 0.01 to about 1.0.

When the magnetoplasmonic particle includes the spherical core-shell particle, the shell has a structure substantially surrounding the entire surface of the core, C refers to any one value greater than zero, and B refers to any one value in the range of 50 to 200, the value of Equation 1 may be from about 0.01 to about 1.0, for example, from about 0.01 to about 0.80, for example, from about 0.01 to about 0.50.

In another embodiment, when the magnetoplasmonic particle includes the spherical core-shell particle and the shell has a half-shell structure substantially surrounding a part of the surface of the core, the value of Equation 1 may be about 0 to about 19.00, for example, from about 0 to about 18.00, for example, from about 0 to about 17.00. At this time, for example, the magnetoplasmonic particle may include the core-shell particle provided with the core including the magnetic component; and the shell including the metal component.

When the magnetoplasmonic particle includes the spherical core-shell particle, the shell has a half-shell structure substantially surrounding a part of the surface of the core, and C refers to any one value greater than zero, the value of Equation 1 may be from about 1.00 to about 19.00, for example, from about 1.50 to about 19.00, for example, from about 2.00 to about 18.00, for example, from about 2.50 to about 17.00.

When the magnetoplasmonic particle includes the spherical core-shell particle, the shell has a half-shell structure substantially surrounding a part of the surface of the core, C refers to any one value greater than zero, and B refers to any one value in the range of 50 to 200, the value of Equation 1 may be from about 1.00 to about 17.00, for example, from about 1.00 to about 15.00, for example, from about 1.00 to about 14.00.

In still another embodiment, when the magnetoplasmonic particle includes the rod-shaped core-shell particle and the shell has a structure substantially surrounding the entire surface of the core, the value of Equation 1 may be about 0 to about 3.0. At this time, for example, the magnetoplasmonic particle may include the core-shell particle provided with the core including the metal component; and the shell including the magnetic component.

When the magnetoplasmonic particle includes the rod-shaped core-shell particle, the shell has a structure substantially surrounding the entire surface of the core, and C refers to any one value greater than zero, a value of Equation 1 may be from about 0.1 to about 3.5, for example, from about 0.1 to about 3.0, for example, from about 0.2 to about 3.5, for example, from about 0.2 to about 3.5, for example, from about 0.3 to about 3.5, for example, from about 0.3 to about 3.0.

When the magnetoplasmonic particle includes the rod-shaped core-shell particle, the shell has a structure substantially surrounding the entire surface of the core, C refers to any one value greater than zero, and B refers to any one value in the range of 75 to 200, the value of Equation 1 may be from about 0.1 to about 3.0, for example, from about 0.1 to about 2.0, for example, from about 0.1 to about 1.8.

As the magnetoplasmonic particle serves as a configuration unit of the nano-structure, the nano-structure may satisfy the value of Equation 1 in the above-described range, thereby implementing excellent chirality provision/changing performance. Specifically, by applying the magnetoplasmonic particle, it is possible to greatly improve the efficiency of the manufacturing process, and improve structural precision and reliability compared to conventional methods such as using a chemical synthesis method or using a separate template in order to manufacture a structure having chirality. In addition, the nano-structure having the magnetoplasmonic particle as a configuration unit can secure the immediate real-time property in giving or modulating chirality. These nano-structures may be widely used in various optical device and bio-sensor fields that require a polarization function, and in particular, enable precise and immediate modulation of chiral properties, and thus may serve as an active and dynamic optical activation means for next-generation displays such as 3Ds or holographic displays which requires ultra-high-speed conversion, real-time adjustment, and precise color implementation.

Hereinafter, a method of manufacturing the magnetoplasmonic particle will be described in detail.

The magnetoplasmonic particle may be manufactured by a manufacturing method including an operation of preparing a raw material component for a core; an operation of preparing a raw material component for a shell; and an operation of mixing the raw material component for the core with the raw material component for the shell and reacting the mixture.

In the manufacturing method, the raw material component for the shell may contain a component different from the raw material component for the core. In one embodiment, the raw material component for the core may contain a first metal or a salt thereof, the raw material component for the shell may contain a second metal or a salt thereof, in which the first metal and the second metal may be different metals from each other.

Each of the first metal and the second metal may independently contain one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd), and combinations thereof.

In one embodiment, the first metal may contain one selected from silver (Ag), gold (Au), and combinations thereof, and the second metal may contain one selected from nickel (Ni), cobalt (Co), iron (Fe) and combinations thereof.

In another embodiment, the first metal may contain one selected from nickel (Ni), cobalt (Co), iron (Fe), and combinations thereof, and the second metal may contain one selected from silver (Ag), gold (Au) and combinations thereof.

The shape of the magnetoplasmonic particle to be manufactured by the manufacturing method may include the core, and may be the core-shell particle including the shell surrounding at least a part of the surface of the core. All of the above-described matters for the magnetoplasmonic particle may be equally, integrally applied to the matters of the shape, structure, and composition of the core-shell particle.

The shape of the magnetoplasmonic particle to be manufactured by the manufacturing method may be a spherical core-shell particle or a rod-shaped core-shell particle. All of the above-described matters for the magnetoplasmonic particle may be equally, integrally applied to the matters of the spherical core-shell particle and the rod-shaped core-shell particle.

An operation of mixing the raw material component for the core with the raw material component for the shell and then reacting the mixture may be an operation of reacting at about 100° C. to about 300° C. for about 1 hour to about 15 hours. By mixing and reacting each raw material component of the core and the shell in the temperature range and the time range, it may be more advantageous to process a core-shell particle having a desired shape and size.

The core-shell particle including the core and the shell surrounding at least a part of the surface of the core through the operation of mixing the raw material component for the core with the raw material component for the shell and then reacting the mixture may be manufactured.

The method of manufacturing the magnetoplasmonic particle may further include an operation of treating a surface of the core-shell particle. Predetermined physical properties can be given to the surface of the core-shell particle through the operation of treating the surface, thereby securing necessary functions in terms of dispersibility and aggregation prevention of the magnetoplasmonic particle in a subsequent process.

For example, the operation of treating the surface may be an operation of giving hydrophilicity to the surface of the core-shell particle. In this case, the magnetoplasmonic particle can secure the dispersibility in the hydrophilic solvent phase, thereby securing properties that are advantageous for performing necessary subsequent processing in a state of being dispersed in the solvent.

In one embodiment, the operation of treating the surface may include an operation of mixing a surface treatment material with the core-shell particle and then treating the mixture using ultrasonic waves. The surface treatment can be efficiently performed within a relatively short time using the ultrasonic treatment.

In one embodiment, the surface treatment material may contain citric acid. When the citric acid is used as the surface treatment material, about 40 to about 70 parts by weight of the citric acid may be used based on 100 parts by weight of the core-shell particle. In this case, it may be more advantageous in terms of giving a desired degree of physical properties to the surface of the core-shell particle, and as a result, it may be advantageous to ensure dispersibility of the core-shell particle.

The magnetoplasmonic particle having the above-described technical characteristics and advantages can be manufactured through the manufacturing method of the magnetoplasmonic particle, and furthermore, the nano-structure to which the magnetoplasmonic particle is applied can be obtained.

Hereinafter, a method of manufacturing the nano-structure will be described in detail.

The nano-structure may be manufactured by a method including: a magnetic field forming operation; a particle placement operation of disposing two or more nanoparticles within the magnetic field; and a magnetic adjustment operation of adjusting at least one among a magnetic flux density, a magnetization direction, and a spatial range of the magnetic field, in which the nanoparticles disposed within the magnetic field is aligned to correspond to the structure of the magnetic field in the magnetic adjustment operation to form the nano-structure whose entire structure has chirality.

In the magnetic field forming operation, the magnetic field is not specially limited as long as it has a structure capable of finally giving chirality to the nano-structure, but may be, for example, a magnetic field of a spiral structure. When the magnetic field is the spiral magnetic field, the nano-structure has chirality resulting from the spiral structure. At this time, the structural chirality induced from the magnetic field may be transferred to the nanoparticle, and thus the aligned structure of the nanoparticle may be manufactured to have chirality resulting from the spiral structure.

FIG. 5 is a schematic diagram schematically showing the method of manufacturing the nano-structure according to one embodiment.

For example, in the magnetic field forming operation, the magnetic field may be a spiral magnetic field 13 formed by relatively rotating at least two magnetic substances 11, 12. The two magnetic substances 11, 12 may be disposed to face each other in the same magnetization direction (y-axis direction), and then rotated in opposite directions using an axis passing through each center (y-axis) as a rotation axis to form the spiral magnetic field 13.

FIG. 6 is a schematic diagram showing a case in which the two magnetic substances 11, 12 are each rotated but rotated in opposite directions in the y-axis direction. Referring to FIG. 6, one magnetic substance 11 may be rotated clockwise so that an angle θ1 between a long axis L1 and a z-axis is in the range of 0°<θ1<180°, and the other magnetic material 12 may be rotated counterclockwise so that an angle θ2 between a long axis L2 and the z axis is in the range of 0°>θ2>−180°. The structure of the spiral magnetic field may be determined by adjusting the θ1 and θ2.

In one embodiment, the two magnetic substances 11, 12 may be rotated so that sizes of absolute values of θ1 and θ2 are the same. In addition, the structure of the spiral magnetic field 13 may be determined by adjusting the sizes of θ1 and θ2. The spiral magnetic field 13 has chirality by having a mirror surface asymmetric structure, and the degree of chirality may be adjusted depending on the sizes of θ1 and θ2. When the sizes of the absolute values of θ1 and θ2 are referred to as θ, the size of the chirality of the spiral magnetic field 13 may be proportional to the size of sin(2θ).

In one embodiment, each of the two magnetic substances 11, 12 may independently include a neodymium magnet, a ferrite magnet, or an electromagnet. Specifically, a magnetic flux density of the magnetic substance may be from about 1 μT to about 5 T, for example, from about 0.01 T to about 0.4 T, for example, from about 0.01 T to about 0.3 T.

In one embodiment, a magnetic substance separation distance defined as a straight distance connecting the centers of the two magnetic substances 11, 12 may be about 1 μm to about 10 m, for example, about 1 μm to about 5 m, for example, about 1 μm to about 1 m, for example, from 1 μm to about 80 cm, for example, from about 1 cm to about 50 cm, for example, from about 1 cm to about 10 cm, for example, from about 1 cm to about 8 cm, for example, from about 1 cm to about 6 cm, for example, from about 1 cm to about 5 cm, for example, from about 1 cm to about 4 cm.

The method of manufacturing the nano-structure includes the particle placement operation of disposing at least two or more nanoparticles within the magnetic field. FIG. 7 schematically shows the particle placement operation 20.

The particle placement operation 20 is an operation of disposing target particles for giving chirality within the magnetic field generated in the magnetic field forming operation. The particle placement operation may also be performed before the magnetic field forming operation, or may also be performed after the magnetic field forming operation. In other words, the nanoparticle may also be disposed in a region in which the magnetic field is to be formed in advance before the magnetic field is formed, or may also be disposed in a region in which the magnetic field is formed after the magnetic field is formed.

All matters of the nanoparticles are the same as those of the chiral nano-structure as described above.

FIG. 7 exemplarily shows a case in which the particle is disposed before the magnetic field forming operation. Referring to FIG. 7, in the particle placement operation 20, the nanoparticle may be disposed within the magnetic field in a state of being dispersed in a solvent or a dispersion medium. Specifically, the particle placement operation 20 may be performed in a method of manufacturing the colloidal solution 21 containing at least two or more of the nanoparticles, and then disposing the colloidal solution 21 within the magnetic field.

The concentration of the nanoparticles in the colloidal solution 21 may be about 5 μg/mL to about 500 mg/mL, for example, about 5 μg/mL to about 400 mg/mL, for example, about 10 mg/mL to about 400 mg/mL. By dispersing the nanoparticles in the above-described concentration range and applying the dispersed nanoparticles to the manufacturing method, it may be advantageous for the nanoparticles to be arranged in an aligned structure having chirality without agglomeration, and three-dimensional (3D) chiral nano-structure consisting of at least two or more of the nanoparticles may be precisely formed.

The solvent or the dispersion medium may contain one selected from the group consisting of distilled water, deionized water, alcohol, organic solvents, polymers, and combinations thereof, but is not limited thereto. It is understood that the 'polymer' is a polymer having a weight average molecular weight (Mw) of about 500 or more, and collectively refers to a hydrophilic, hydrophobic, or amphiphilic liquid or solid state polymer, which may have a viscosity of about 5 cP to 6000 cP at room temperature, may be composed of a mixture of one type or two or more types, and may serve as a dispersion medium for the nanoparticle.

The method of manufacturing the chiral nano-structure includes the magnetic field adjustment operation of adjusting at least one of the magnetic flux density, the magnetization direction, and the spatial range of the magnetic field. The magnetic field adjustment operation is an operation of giving a desired level of chirality to the nanoparticles disposed within the magnetic field by changing the magnetic field formed in the magnetic field forming operation. The magnetic field adjustment operation may also be performed simultaneously with the magnetic field formation operation, or may also be performed with a predetermined time difference. In other words, in the magnetic field forming operation, a magnetic field having a desired structure may also be formed by adjusting at least one among the magnetic flux density, the magnetization direction, and the spatial range of the magnetic field at the same time as the magnetic field is formed; alternatively, the magnetic field having a different structure may also be formed by adjusting at least one among the magnetic flux density, the magnetization direction, and the spatial range of the magnetic field later with respect to the magnetic field first formed in the magnetic field forming operation. For example, the former case may include a case in which chirality is first given to a non-chiral nanoparticle dispersion, and the latter case may include a case where different chirality is given to the existing nano-structure having chirality.

In the magnetic field adjustment operation, the arrangement of the nanoparticles disposed within the magnetic field may be changed and the finally aligned structure thereof may be adjusted to correspond to the chirality of the magnetic field, thereby finally forming the nano-structure having chirality. When the arrangement of the nanoparticles disposed within the magnetic field is aligned to correspond to the structure of the magnetic field, it means that the aligned structure by the arrangement of the nanoparticles does not have chirality and then has chirality by receiving the chirality of the magnetic field, or has a chirality different from the existing chirality.

When the magnetic field formed in the magnetic field forming operation is, for example, the spiral magnetic field, the magnetic field has chirality induced from a mirror surface asymmetric structure. At this time, at least two or more nanoparticles disposed within the magnetic field may receive the structural chirality of the spiral magnetic field through the arrangement change by the magnetic field to form an aligned structure having substantially the same level of chirality. Accordingly, when at least one among the magnetic flux density, the magnetization direction, and the spatial range of the magnetic field is changed, the chirality of the magnetic field is changed, and thus the chirality of the aligned structure of the nanoparticles disposed within the magnetic field is also changed. For example, when the magnetic flux density is increased in the magnetic field adjustment operation, a peak on a circular dichroism spectroscopy graph of the nano-structure is moved toward a shorter wavelength.

For example, in the magnetic field forming operation, the magnetic field may be the spiral magnetic field formed by relatively rotating at least two magnetic substances, and in the magnetic field adjustment operation, the magnetization direction of the magnetic field may be adjusted by changing at least one of the angle at which the at least two magnetic substances are relatively rotated and the degree at which the at least two magnetic substances are parallel to each other.

For example, in the magnetic field forming operation, the magnetic field may be the spiral magnetic field formed by relatively rotating at least two magnetic substances, and in the magnetic field adjustment, the spatial range of the magnetic field may be adjusted by changing the straight distance between the at least two magnetic substances.

For example, in the magnetic field forming operation, the magnetic field may be the spiral magnetic field formed by relatively rotating at least two magnetic substances, and in the magnetic field adjustment operation, the magnetic flux density of the magnetic field may be adjusted by changing at least one of magnetic forces of the at least two magnetic substances and the straight distance between the at least two magnetic substances.

It is possible to manufacture the chiral nano-structure as described above through the manufacturing method of the chiral nano-structure. In addition, a chiral nano-structure satisfying Equation 1 below may be manufactured through the method of manufacturing the chiral nano-structure.

$$0 \leq \frac{A \times B \times C}{P_{max}} \leq 3.5 \qquad \text{Equation 1A}$$

In Equation 1A, A refers to a value of the ratio of the average particle diameter (nm) of the core to the average thickness (nm) of the shell of the nanoparticle; or the ratio of the average width (nm) of the core to the average thickness (nm) of the shell, B refers to the value of the concentration ($\mu$g/mL) of the nanoparticle, C refers to the ratio of the relative chirality size for the size value of chirality $\tau$ of 1.0 when the rotation angle $\theta$ of the spiral magnetic field applied to the chiral nano-structure is 45°, and Pmax refers to the absolute value of the maximum peak value of the circular dichroism spectroscopy under the B and C conditions of the nano-structure satisfying A.

The description of Equation 1 and each factor constituting Equation 1 are the same as described above in connection to the chiral nano-structure.

Hereinafter, specific examples of the present disclosure are presented. However, the examples described below are only for specifically showing or describing the present disclosure, and thus the scope of the present disclosure is not limitedly interpreted, and the scope of the present disclosure is determined by the claims.

EXAMPLES AND COMPARATIVE EXAMPLE

Example 1. Magnetic Plasmon Particle (I)

A mixed solution was manufactured by mixing 3.2 mmol of iron nitrate ($Fe(NO_3)_3 \cdot 9H_2O$) with 40 mL of ethylene glycol ($C_2H_4(OH)_2$) to stir a mixture using a magnetic stirrer until completely dissolved. 35 mmol of sodium acetate ($CH_3COONa$) and 0.59 mmol of silver nitrate ($AgNO_3$) were put into the mixed solution and continuously stirred. When the sodium acetate and the silver nitrate were all dissolved, the mixed solution was transferred to a Teflon container, put into a metal container to withstand a pressure, then heated at 210° C., and then kept for 4 hours. After the reaction was finished, the synthesized particles were separated by centrifugation and the like, and purified using ethanol and deionized water. The separated particles were dried in a vacuum oven for 12 hours and manufactured in the form of a powder.

Subsequently, a surface pretreatment operation of attaching a hydrophilic functional group to the surface of the particle was performed to disperse the particle in a polar solvent such as deionized water. 1 mg of the nanoparticles in the form of powder manufactured in the particle synthesis operation and 0.6 mg of citric acid (HOC(COOH) ($CH_2COOH)_2$) were put into 1 mL of deionized water, and treated using ultrasonic waves for 2 hours, and then the particles were separated by centrifugation and the like and purified with deionized water.

Accordingly, as the spherical core-shell particle provided with the core including silver (Ag) and the shell including iron oxide ($Fe_3O_4$), the magnetoplasmonic particle having the structure in which the shell substantially surrounded the entire surface of the core was manufactured. The average diameter of the core was 61.4 ($\pm$13.3) nm, and the average thickness of the shell was 54.3 ($\pm$5.7) nm.

Example 2. Magnetic Plasmon Particle (II)

A mixed solution was manufactured by mixing 1.6 mmol of iron nitrate ($Fe(NO_3)_3 \cdot 9H_2O$) with 40 mL of ethylene glycol ($C_2H_4(OH)_2$) to stir a mixture using a magnetic stirrer until completely dissolved. 35 mmol of sodium acetate ($CH_3COONa$) and 0.59 mmol of silver nitrate ($AgNO_3$) were put into the mixed solution and continuously stirred.

When the sodium acetate and the silver nitrate were all dissolved, the mixed solution was transferred to a Teflon container, put into a metal container to withstand a pressure, then heated at 210° C., and then kept for 4 hours. After the reaction was finished, the synthesized particles were separated by centrifugation and the like, and purified using ethanol and deionized water. The separated particles were dried in a vacuum oven for 12 hours and manufactured in the form of a powder.

Subsequently, a surface pretreatment operation of attaching a hydrophilic functional group to the surface of the particle was performed to disperse the particle in a polar solvent such as deionized water. 1 mg of the particles in the form of powder manufactured in the particle synthesis operation and 0.6 mg of citric acid (HOC(COOH) (CH$_2$COOH)$_2$) were put into 1 mL of deionized water, and treated using ultrasonic waves for 2 hours, and then the nanoparticles were separated by centrifugation and the like and purified with deionized water.

Accordingly, as the spherical core-shell particle provided with the core including silver (Ag) and the shell including iron oxide (Fe$_3$O$_4$), the magnetoplasmonic particle having the structure in which the shell substantially surrounded the entire surface of the core was manufactured. The average diameter of the core was 50.2 (±12.2) nm, and the average thickness of the shell was 56.3 (±7.4) nm.

Example 3. Magnetic Plasmon Particle (III)

A mixed solution was manufactured by mixing 4.0 mmol of iron chloride (FeCl$_3$·6H$_2$O) with 40 mL of ethylene glycol (C$_2$H$_4$(OH)$_2$) to stir the mixture using a magnetic stirrer until completely dissolved. 35 mmol of sodium acetate (CH$_3$COONa) and 0.59 mmol of chloroauric acid (HAuCl$_4$·3H$_2$O) were put into the mixed solution, and continuously stirred. When both the sodium acetate and the chloroauric acid were dissolved, the mixed solution was transferred to a Teflon container, put into a metal container to withstand a pressure, then heated at 200° C., and then kept for 8 hours. After the reaction was finished, the synthesized particles were separated by centrifugation and the like, and purified using ethanol and deionized water. The separated particles were dried in a vacuum oven for 12 hours and manufactured in the form of a powder.

Subsequently, a surface pretreatment operation of attaching a hydrophilic functional group to the surface of the particle was performed to disperse the particle in a polar solvent such as deionized water. 1 mg of the particles in the form of powder manufactured in the particle synthesis operation and 0.6 mg of citric acid (HOC(COOH) (CH$_2$COOH)$_2$) were put into 1 mL of deionized water, and treated using ultrasonic waves for 2 hours, and the particles were by centrifugation and the like and purified with ionized water.

Accordingly, as the rod-shaped core-shell magnetoplasmonic particle provided with the core containing gold (Au) and the shell containing iron oxide (Fe$_3$O$_4$), the magnetoplasmonic particle having the structure in which the shell substantially surrounded the entire surface of the core was manufactured. The average length of the core was 2454 (±624) nm, the average width of the core was 78 (±16) nm, and the average thickness of the shell was 107 (±12) nm.

Example 4. Magnetic plasmon particle (IV)

A mixed solution was manufactured by mixing 0.12 M of iron chloride (Fe(NO$_3$)$_3$·9H$_2$O) and 34 mM of citric acid in 20 mL of ethylene glycol (C$_2$H$_4$(OH)$_2$) solution to stir the mixture using a magnetic stirrer until completely dissolved. Sodium acetate (CH$_3$COONa) was added to the mixed solution to adjust the concentration to 0.73 M. When all sodium acetate were dissolved, the mixed solution was transferred to a Teflon container, put into a metal container to withstand the pressure, then heated at 200° C., and kept for 10 hours. After the reaction was finished, the synthesized nanoparticles are separated by centrifugation and the like, and purified with ethanol and deionized water. The separated nanoparticles were dried in a vacuum oven for 12 hours to manufacture the nanoparticles in the form of powder.

Subsequently, a surface pretreatment operation of attaching a hydrophilic functional group to the surface of the nanoparticle was performed to disperse the nanoparticle in a polar solvent such as deionized water. 1 mg of the nanoparticle in the form of powder manufactured in the nanoparticle synthesis operation and 0.6 mg of citric acid (HOC(COOH) (CH$_2$COOH)$_2$) were put into 1 mL of deionized water, and treated using ultrasonic waves for 2 hours, and then the nanoparticles were separated by centrifugation and the like, and purified with deionized water.

A slide glass was treated with a piranha solution to remove organic matter and foreign substances to manufacture a hydrophilic surface. The slide glass was immersed in 0.2 wt % polydiallyldimethylammonium chloride (PDDA) polymer solution so that the positively charged polyvinyl alcohol (PVA) polymer could be evenly distributed on the surface of the slide glass. Thereafter, the slide glass was taken out and dried, and then the prepared particle solution was dropped on the slide glass so that the negatively charged nanoparticles could be uniformly attached to the surface of the positively charged PDDA, and the remaining solutions were gently washed with deionized water and dried. A coating of about 20 nm was applied to the nanoparticles aligned on the slide glass as a single layer using gold sputtering. Thereafter, cysteine having a concentration of 1 mg/mL was added in excess and then reacted for 12 hours at 60 rpm in a shaking incubator in order to stabilize the surface of the coated gold thin film. After the reaction was finished, the particle single layer was separated from the slide glass through ultrasonic treatment, and the particles were separated using a magnet and purified with deionized water.

Accordingly, as the spherical core-shell particle provided with the core containing iron oxide (Fe$_3$O$_4$) and the shell containing gold (Au), the magnetoplasmonic particle having the half-shell structure in which the shell substantially surrounded a part of the surface of the core was manufactured. The average diameter of the core was 204.6 (±23.6) nm, and the average thickness of the shell was 22.8 (±1.8) nm.

MEASUREMENT EXAMPLE

Measurement Example 1: Variability Evaluation Due to the Application of the Magnetic Field For the magnetoplasmonic particles in Examples 1 to 4, as shown in Tables 1 to 4, respectively, particle dispersions were manufactured by dispersing the magnetoplasmonic particles in a solvent of deionized water at different concentrations.

Two neodymium magnets (50×10×2 mm, 0.2 T) were prepared, and as shown in FIG. 5, the two magnets 11, 12 were disposed to face each other to be spaced apart from each other by an interval of 3 cm in the same magnetization direction (y-axis direction). The particle dispersion 21 of each concentration was disposed on the middle between the two magnets 11, 12. The two magnets 11, 12 were rotated by the same angular size using the y-axis as the rotation axis, one magnet of which was rotated clockwise and the other magnet of which was rotated counterclockwise. FIG. 6 is a perspective diagram showing the two magnets 11, 12 from the y-axis direction after the two magnets 11, 12 are rotated. Referring to FIG. 6, the two magnets 11, 12 were rotated so that the sizes of the angles θ1, θ2 between the long axes L1, L2 of each of the magnets 11, 12 and the z-axis, that is, the sizes of the rotation angles of the two magnets 11, 12 were the same as those shown in Tables 1 to 4, respectively. Accordingly, referring to FIGS. 5 and 7, the spiral magnetic field 13 according to each condition was applied to the particle dispersion 21.

According to each condition, as the arrangement of the magnetoplasmonic particles of Examples 1 to 4 was changed, a three-dimensional nano-structure having a predetermined alignment structure was manufactured. This could be confirmed from the change in spectrum when the spectrum for the nano-structure manufactured according to each magnetic field application condition was measured under the conditions of a scan rate of 500 nm/min, a data interval of 0.5 nm, and a wavelength range of 200 nm to 900 nm using a circular dichroism spectrometer (JASCO, J-1500). The peak values of the spectrum are as described in Tables 1 to 4, respectively. In addition, the CD spectrum for each concentration and rotation angle of the nano-structure for each of the magnetoplasmonic particle in Examples 1 to 4 is shown in FIGS. 8 to 11, respectively.

Measurement Example 2: Chirality of the Nano-Structure

As measured in Measurement Example 1, it could be confirmed that each of the three-dimensional nano-structures manufactured by changing the magnetic field application conditions with respect to each of the magnetoplasmonic particles in Examples 1 to 4 had chirality because the circular dichroism spectrum (CD) showed a peak.

At this time, for each of the nano-structures manufactured using each of the magnetoplasmonic particles in Examples 1 to 4, the value of Equation 1 below was obtained by setting the ratio of the average particle diameter (nm) of the core to the average thickness (nm) of the shell as an A value when the magnetoplasmonic particle was the spherical core-shell particle, and setting the ratio of the average width (nm) of the core to the average thickness (nm) of the shell as an A value when the magnetoplasmonic particle was the rod-shaped core-shell particle.

$$\frac{A \times B \times C}{P_{max}} \qquad \text{Equation 1}$$

C was a value obtained by calculating the size of the relative chirality ($\sin(2\theta)$) for the size value of the chirality τ of 1.0 when the size of the rotation angle θ is 45° with respect to each of the rotation angles θ1, θ2 of the two magnets 11, 12 for applying a magnetic field to the magnetoplasmonic particle.

The values of A, B, and C and the value of Equation 1 for each nano-structure are shown in Tables 1 to 4 below.

TABLE 1

| Particle (I) | Concentration (B) [μg/mL] | θ [°] | τ relative ratio (C) (\|sin2θ\|) [θ = degree] | CD spectrum [mdeg] | | | (A * B * C)/Pmax (A = 61.4/54.3) |
|---|---|---|---|---|---|---|---|
| | | | | About @680 nm | About @830 nm | Pmax | |
| Example 1-1 | 25 | 0 | 0.00 | 24.0099 | −27.7944 | 27.7944 | 0.00 |
| Example 1-2 | 50 | 0 | 0.00 | −1.18151 | −3.35958 | 3.35958 | 0.00 |
| Example 1-3 | 75 | 0 | 0.00 | 67.0504 | −117.419 | 117.419 | 0.00 |
| Example 1-4 | 100 | 0 | 0.00 | 95.599 | −174.176 | 174.176 | 0.00 |
| Example 1-5 | 125 | 0 | 0.00 | 59.8761 | −168.584 | 168.584 | 0.00 |
| Example 1-6 | 150 | 0 | 0.00 | 62.7865 | −196.911 | 196.911 | 0.00 |
| Example 1-7 | 175 | 0 | 0.00 | 41.5222 | −158.031 | 158.031 | 0.00 |
| Example 1-8 | 200 | 0 | 0.00 | 24.2616 | −142.455 | 142.455 | 0.00 |
| Example 1-9 | 25 | 15 | 0.50 | −4.5823 | 14.4494 | 14.4494 | 0.98 |
| Example 1-10 | 50 | 15 | 0.50 | −85.6535 | 220.452 | 220.452 | 0.13 |
| Example 1-11 | 75 | 15 | 0.50 | −131.236 | 324.921 | 324.921 | 0.13 |
| Example 1-12 | 100 | 15 | 0.50 | −261.17 | 721.541 | 721.541 | 0.08 |
| Example 1-13 | 125 | 15 | 0.50 | −404.182 | 1147.69 | 1147.69 | 0.06 |
| Example 1-14 | 150 | 15 | 0.50 | −443.853 | 1276.1 | 1276.1 | 0.07 |
| Example 1-15 | 175 | 15 | 0.50 | −245.245 | 818.711 | 818.711 | 0.12 |
| Example 1-16 | 200 | 15 | 0.50 | −415.379 | 1174.39 | 1174.39 | 0.10 |
| Example 1-17 | 25 | 30 | 0.87 | −22.7185 | 79.474 | 79.474 | 0.31 |

TABLE 1-continued

| Particle (I) | Concentration (B) [μg/mL] | θ [°] | τ relative ratio (C) (\|sin2θ\|) [θ = degree] | CD spectrum [mdeg] | | | (A * B * C)/Pmax (A = 61.4/54.3) |
|---|---|---|---|---|---|---|---|
| | | | | About @680 nm | About @830 nm | Pmax | |
| Example 1-18 | 50 | 30 | 0.87 | −121.04 | 417.616 | 417.616 | 0.12 |
| Example 1-19 | 75 | 30 | 0.87 | −272.214 | 646.457 | 646.457 | 0.11 |
| Example 1-20 | 100 | 30 | 0.87 | −490.672 | 1414.71 | 1414.71 | 0.07 |
| Example 1-21 | 125 | 30 | 0.87 | −678.063 | 2063.78 | 2063.78 | 0.06 |
| Example 1-22 | 150 | 30 | 0.87 | −634.406 | 1913.76 | 1913.76 | 0.08 |
| Example 1-23 | 175 | 30 | 0.87 | −825.094 | 2361.52 | 2361.52 | 0.07 |
| Example 1-24 | 200 | 30 | 0.87 | −755.049 | 2214.15 | 2214.15 | 0.09 |
| Example 1-25 | 25 | 45 | 1.00 | −20.9936 | 76.835 | 76.835 | 0.37 |
| Example 1-26 | 50 | 45 | 1.00 | −140.436 | 511.409 | 511.409 | 0.11 |
| Example 1-27 | 75 | 45 | 1.00 | −306.815 | 1080.49 | 1080.49 | 0.08 |
| Example 1-28 | 100 | 45 | 1.00 | −591.983 | 1926.45 | 1926.45 | 0.06 |
| Example 1-29 | 125 | 45 | 1.00 | −742.859 | 2263.11 | 2263.11 | 0.06 |
| Example 1-30 | 150 | 45 | 1.00 | −722.538 | 2269.08 | 2269.08 | 0.07 |
| Example 1-31 | 175 | 45 | 1.00 | −941.641 | 2738.09 | 2738.09 | 0.07 |
| Example 1-32 | 200 | 45 | 1.00 | −1018.3 | 2892.83 | 2892.83 | 0.08 |
| Example 1-33 | 25 | 60 | 0.87 | −20.8995 | 73.6665 | 73.6665 | 0.33 |
| Example 1-34 | 50 | 60 | 0.87 | −88.4849 | 346.019 | 346.019 | 0.14 |
| Example 1-35 | 75 | 60 | 0.87 | −276.003 | 781.403 | 781.403 | 0.09 |
| Example 1-36 | 100 | 60 | 0.87 | −502.098 | 1540.75 | 1540.75 | 0.06 |
| Example 1-37 | 125 | 60 | 0.87 | −655.969 | 2052.61 | 2052.61 | 0.06 |
| Example 1-38 | 150 | 60 | 0.87 | −710.642 | 2167.07 | 2167.07 | 0.07 |
| Example 1-39 | 175 | 60 | 0.87 | −780.289 | 2379.01 | 2379.01 | 0.07 |
| Example 1-40 | 200 | 60 | 0.87 | −848.356 | 2460.57 | 2460.57 | 0.08 |
| Example 1-41 | 25 | 75 | 0.50 | −0.245546 | 24.6635 | 24.6635 | 0.57 |
| Example 1-42 | 50 | 75 | 0.50 | −36.2108 | 158.793 | 158.793 | 0.18 |
| Example 1-43 | 75 | 75 | 0.50 | −143.936 | 461.295 | 461.295 | 0.09 |
| Example 1-44 | 100 | 75 | 0.50 | −262.514 | 825.693 | 825.693 | 0.07 |
| Example 1-45 | 125 | 75 | 0.50 | −359.163 | 1140.66 | 1140.66 | 0.06 |
| Example 1-46 | 150 | 75 | 0.50 | −357.154 | 1284.65 | 1284.65 | 0.07 |
| Example 1-47 | 175 | 75 | 0.50 | −436.247 | 1330.04 | 1330.04 | 0.07 |
| Example 1-48 | 200 | 75 | 0.50 | −399.246 | 1214.5 | 1214.5 | 0.09 |
| Example 1-49 | 25 | 90 | 0.00 | 16.0777 | −44.0767 | 44.0767 | 0.00 |
| Example 1-50 | 50 | 90 | 0.00 | 28.9884 | −64.2371 | 64.2371 | 0.00 |
| Example 1-51 | 75 | 90 | 0.00 | 52.7822 | −126.687 | 126.687 | 0.00 |
| Example 1-52 | 100 | 90 | 0.00 | 60.1336 | −105.996 | 105.996 | 0.00 |
| Example 1-53 | 125 | 90 | 0.00 | 60.7256 | −132.183 | 132.183 | 0.00 |
| Example 1-54 | 150 | 90 | 0.00 | 44.4219 | −102.583 | 102.583 | 0.00 |

TABLE 1-continued

| | | | τ relative ratio (C) | CD spectrum [mdeg] | | | |
|---|---|---|---|---|---|---|---|
| Particle (I) | Concentration (B) [μg/mL] | θ [°] | (\|sin2θ\|) [θ = degree] | About @680 nm | About @830 nm | Pmax | (A * B * C)/Pmax (A = 61.4/54.3) |
| Example 1-55 | 175 | 90 | 0.00 | 54.9442 | −120.422 | 120.422 | 0.00 |
| Example 1-56 | 200 | 90 | 0.00 | 28.7288 | −86.9 | 86.9 | 0.00 |
| Example 1-57 | 25 | 105 | 0.50 | 34.9145 | −105.617 | 105.617 | 0.13 |
| Example 1-58 | 50 | 105 | 0.50 | 74.5349 | −224.161 | 224.161 | 0.13 |
| Example 1-59 | 75 | 105 | 0.50 | 231.221 | −719.515 | 719.515 | 0.06 |
| Example 1-60 | 100 | 105 | 0.50 | 381.372 | −1127.94 | 1127.94 | 0.05 |
| Example 1-61 | 125 | 105 | 0.50 | 493.191 | −1466.55 | 1466.55 | 0.05 |
| Example 1-62 | 150 | 105 | 0.50 | 472.662 | −1430.01 | 1430.01 | 0.06 |
| Example 1-63 | 175 | 105 | 0.50 | 479.217 | −1467.72 | 1467.72 | 0.07 |
| Example 1-64 | 200 | 105 | 0.50 | 440.318 | −1416.95 | 1416.95 | 0.08 |
| Example 1-65 | 25 | 120 | 0.87 | 44.0728 | −147.612 | 147.612 | 0.17 |
| Example 1-66 | 50 | 120 | 0.87 | 115.376 | −398.886 | 398.886 | 0.12 |
| Example 1-67 | 75 | 120 | 0.87 | 348.892 | −1100.23 | 1100.23 | 0.07 |
| Example 1-68 | 100 | 120 | 0.87 | 570.329 | −1844.23 | 1844.23 | 0.05 |
| Example 1-69 | 125 | 120 | 0.87 | 803.536 | −2343.33 | 2343.33 | 0.05 |
| Example 1-70 | 150 | 120 | 0.87 | 754.928 | −2261.11 | 2261.11 | 0.06 |
| Example 1-71 | 175 | 120 | 0.87 | 899.43 | −2568.77 | 2568.77 | 0.07 |
| Example 1-72 | 200 | 120 | 0.87 | 905.293 | −2470.57 | 2470.57 | 0.08 |
| Example 1-73 | 25 | 135 | 1.00 | 51.5963 | −186.348 | 186.348 | 0.15 |
| Example 1-74 | 50 | 135 | 1.00 | 165.941 | −582.582 | 582.582 | 0.10 |
| Example 1-75 | 75 | 135 | 1.00 | 414.199 | −1300.25 | 1300.25 | 0.07 |
| Example 1-76 | 100 | 135 | 1.00 | 680.842 | −2144.71 | 2144.71 | 0.05 |
| Example 1-77 | 125 | 135 | 1.00 | 805.463 | −2502.3 | 2502.3 | 0.06 |
| Example 1-78 | 150 | 135 | 1.00 | 882.054 | −2601.23 | 2601.23 | 0.07 |
| Example 1-79 | 175 | 135 | 1.00 | 1071.95 | −3049.28 | 3049.28 | 0.06 |
| Example 1-80 | 200 | 135 | 1.00 | 958.416 | −2714.1 | 2714.1 | 0.08 |
| Example 1-81 | 25 | 150 | 0.87 | 48.8084 | −159.532 | 159.532 | 0.15 |
| Example 1-82 | 50 | 150 | 0.87 | 154.376 | −515.826 | 515.826 | 0.09 |
| Example 1-83 | 75 | 150 | 0.87 | 375.085 | −1174.04 | 1174.04 | 0.06 |
| Example 1-84 | 100 | 150 | 0.87 | 599.926 | −1900.42 | 1900.42 | 0.05 |
| Example 1-85 | 125 | 150 | 0.87 | 757.317 | −2261.12 | 2261.12 | 0.05 |
| Example 1-86 | 150 | 150 | 0.87 | 719.947 | −2231.19 | 2231.19 | 0.07 |
| Example 1-87 | 175 | 150 | 0.87 | 1072.8 | −2985.31 | 2985.31 | 0.06 |
| Example 1-88 | 200 | 150 | 0.87 | 999.777 | −2777.72 | 2777.72 | 0.07 |
| Example 1-89 | 25 | 165 | 0.50 | 37.7221 | −117.342 | 117.342 | 0.12 |
| Example 1-90 | 50 | 165 | 0.50 | 96.7212 | −317.234 | 317.234 | 0.09 |
| Example 1-91 | 75 | 165 | 0.50 | 241.131 | −748.105 | 748.105 | 0.06 |

TABLE 1-continued

| Particle (I) | Concentration (B) [μg/mL] | θ [°] | τ relative ratio (C) (\|sin2θ\|) [θ = degree] | CD spectrum [mdeg] | | | (A * B * C)/Pmax (A = 61.4/54.3) |
|---|---|---|---|---|---|---|---|
| | | | | About @680 nm | About @830 nm | Pmax | |
| Example 1-92 | 100 | 165 | 0.50 | 370.313 | −1163.1 | 1163.1 | 0.05 |
| Example 1-93 | 125 | 165 | 0.50 | 530.478 | −1494.5 | 1494.5 | 0.05 |
| Example 1-94 | 150 | 165 | 0.50 | 470.297 | −1417.91 | 1417.91 | 0.06 |
| Example 1-95 | 175 | 165 | 0.50 | 708.259 | −1794.61 | 1794.61 | 0.06 |
| Example 1-96 | 200 | 165 | 0.50 | 471.786 | −1363.09 | 1363.09 | 0.08 |
| Maximum value of (A * B * C)/Pmax | | | | | | | 0.98 |
| Minimum value of (A * B * C)/Pmax | | | | | | | 0.00 |
| For C > 0, minimum value of (A * B * C)/Pmax | | | | | | | 0.05 |

TABLE 2

| Particle (II) | Concentration (B) [μg/mL] | θ [°] | τ relative ratio (C) (\|sin2θ\|) [θ = degree] | CD spectrum [mdeg] | | | (A * B * C)/Pmax (A = 50.2/56.3) |
|---|---|---|---|---|---|---|---|
| | | | | About @550 nm | About @630 nm | Pmax | |
| Example 2-1 | 25 | 0 | 0.00 | 12.9887 | −33.9227 | 33.9227 | 0.00 |
| Example 2-2 | 50 | 0 | 0.00 | 24.0005 | −69.5656 | 69.5656 | 0.00 |
| Example 2-3 | 75 | 0 | 0.00 | 37.3188 | −90.1883 | 90.1883 | 0.00 |
| Example 2-4 | 100 | 0 | 0.00 | 44.8066 | −147.669 | 147.669 | 0.00 |
| Example 2-5 | 125 | 0 | 0.00 | 69.7232 | −177.941 | 177.941 | 0.00 |
| Example 2-6 | 150 | 0 | 0.00 | 73.5675 | −232.129 | 232.129 | 0.00 |
| Example 2-7 | 175 | 0 | 0.00 | 56.4886 | −211.105 | 211.105 | 0.00 |
| Example 2-8 | 200 | 0 | 0.00 | 80.6551 | −195.476 | 195.476 | 0.00 |
| Example 2-9 | 25 | 15 | 0.50 | 2.04169 | 19.0562 | 19.0562 | 0.58 |
| Example 2-10 | 50 | 15 | 0.50 | −13.2609 | 133.278 | 133.278 | 0.17 |
| Example 2-11 | 75 | 15 | 0.50 | −41.9411 | 319.499 | 319.499 | 0.10 |
| Example 2-12 | 100 | 15 | 0.50 | −71.6352 | 545.872 | 545.872 | 0.08 |
| Example 2-13 | 125 | 15 | 0.50 | −115.016 | 751.164 | 751.164 | 0.07 |
| Example 2-14 | 150 | 15 | 0.50 | −169.939 | 982.81 | 982.81 | 0.07 |
| Example 2-15 | 175 | 15 | 0.50 | −252.55 | 1177.08 | 1177.08 | 0.07 |
| Example 2-16 | 200 | 15 | 0.50 | −286.668 | 1196.82 | 1196.82 | 0.07 |
| Example 2-17 | 25 | 30 | 0.87 | −4.94052 | 55.0064 | 55.0064 | 0.35 |
| Example 2-18 | 50 | 30 | 0.87 | −21.8273 | 221.683 | 221.683 | 0.17 |
| Example 2-19 | 75 | 30 | 0.87 | −66.9534 | 527.974 | 527.974 | 0.11 |
| Example 2-20 | 100 | 30 | 0.87 | −140.085 | 898.497 | 898.497 | 0.09 |
| Example 2-21 | 125 | 30 | 0.87 | −201.536 | 1187.15 | 1187.15 | 0.08 |
| Example 2-22 | 150 | 30 | 0.87 | −285.584 | 1619.41 | 1619.41 | 0.07 |
| Example 2-23 | 175 | 30 | 0.87 | −433.604 | 2225.84 | 2225.84 | 0.06 |

TABLE 2-continued

| Particle (II) | Concentration (B) [μg/mL] | θ [°] | τ relative ratio (C) (\|sin2θ\|) [θ = degree] | CD spectrum [mdeg] About @550 nm | About @630 nm | Pmax | (A * B * C)/Pmax (A = 50.2/56.3) |
|---|---|---|---|---|---|---|---|
| Example 2-24 | 200 | 30 | 0.87 | −486.3 | 2106.9 | 2106.9 | 0.07 |
| Example 2-25 | 25 | 45 | 1.00 | −0.08542 | 55.9676 | 55.9676 | 0.40 |
| Example 2-26 | 50 | 45 | 1.00 | −21.1961 | 212.854 | 212.854 | 0.21 |
| Example 2-27 | 75 | 45 | 1.00 | −74.4058 | 589.566 | 589.566 | 0.11 |
| Example 2-28 | 100 | 45 | 1.00 | −155.121 | 1046.21 | 1046.21 | 0.09 |
| Example 2-29 | 125 | 45 | 1.00 | −210.311 | 1297.41 | 1297.41 | 0.09 |
| Example 2-30 | 150 | 45 | 1.00 | −345.387 | 1916.35 | 1916.35 | 0.07 |
| Example 2-31 | 175 | 45 | 1.00 | −497.619 | 2605.74 | 2605.74 | 0.06 |
| Example 2-32 | 200 | 45 | 1.00 | −605.706 | 2554.89 | 2554.89 | 0.07 |
| Example 2-33 | 25 | 60 | 0.87 | 0.161611 | 46.2883 | 46.2883 | 0.42 |
| Example 2-34 | 50 | 60 | 0.87 | −14.1837 | 166.475 | 166.475 | 0.23 |
| Example 2-35 | 75 | 60 | 0.87 | −53.0223 | 451.453 | 451.453 | 0.13 |
| Example 2-36 | 100 | 60 | 0.87 | −108.765 | 793.788 | 793.788 | 0.10 |
| Example 2-37 | 125 | 60 | 0.87 | −149.601 | 967.583 | 967.583 | 0.10 |
| Example 2-38 | 150 | 60 | 0.87 | −270.391 | 1566.68 | 1566.68 | 0.07 |
| Example 2-39 | 175 | 60 | 0.87 | −384.997 | 1989.45 | 1989.45 | 0.07 |
| Example 2-40 | 200 | 60 | 0.87 | −505.936 | 2198.12 | 2198.12 | 0.07 |
| Example 2-41 | 25 | 75 | 0.50 | 2.59645 | 15.2231 | 15.2231 | 0.73 |
| Example 2-42 | 50 | 75 | 0.50 | −0.765858 | 83.6581 | 83.6581 | 0.27 |
| Example 2-43 | 75 | 75 | 0.50 | −20.7056 | 211.067 | 211.067 | 0.16 |
| Example 2-44 | 100 | 75 | 0.50 | −46.9466 | 413.847 | 413.847 | 0.11 |
| Example 2-45 | 125 | 75 | 0.50 | −61.347 | 427.492 | 427.492 | 0.13 |
| Example 2-46 | 150 | 75 | 0.50 | −146.882 | 838.844 | 838.844 | 0.08 |
| Example 2-47 | 175 | 75 | 0.50 | −183.78 | 916.749 | 916.749 | 0.08 |
| Example 2-48 | 200 | 75 | 0.50 | −256.047 | 1226.8 | 1226.8 | 0.07 |
| Example 2-49 | 25 | 90 | 0.00 | 9.84896 | −18.8676 | 18.8676 | 0.00 |
| Example 2-50 | 50 | 90 | 0.00 | 15.4456 | −28.7567 | 28.7567 | 0.00 |
| Example 2-51 | 75 | 90 | 0.00 | 23.4234 | −56.0573 | 56.0573 | 0.00 |
| Example 2-52 | 100 | 90 | 0.00 | 26.461 | −54.7599 | 54.7599 | 0.00 |
| Example 2-53 | 125 | 90 | 0.00 | 33.0412 | −52.6661 | 52.6661 | 0.00 |
| Example 2-54 | 150 | 90 | 0.00 | 41.7176 | −77.1626 | 77.1626 | 0.00 |
| Example 2-55 | 175 | 90 | 0.00 | 34.1409 | −58.5267 | 58.5267 | 0.00 |
| Example 2-56 | 200 | 90 | 0.00 | 55.8616 | −71.8682 | 71.8682 | 0.00 |
| Example 2-57 | 25 | 105 | 0.50 | 12.1705 | −45.612 | 45.612 | 0.24 |
| Example 2-58 | 50 | 105 | 0.50 | 27.4317 | −107.644 | 107.644 | 0.21 |
| Example 2-59 | 75 | 105 | 0.50 | 58.5299 | −267.077 | 267.077 | 0.12 |
| Example 2-60 | 100 | 105 | 0.50 | 94.0003 | −458.404 | 458.404 | 0.10 |

TABLE 2-continued

| Particle (II) | Concentration (B) [μg/mL] | θ [°] | τ relative ratio (C) (\|sin2θ\|) [θ = degree] | CD spectrum [mdeg] | | | (A * B * C)/Pmax (A = 50.2/56.3) |
|---|---|---|---|---|---|---|---|
| | | | | About @550 nm | About @630 nm | Pmax | |
| Example 2-61 | 125 | 105 | 0.50 | 103.088 | −503.227 | 503.227 | 0.11 |
| Example 2-62 | 150 | 105 | 0.50 | 194.818 | −833.629 | 833.629 | 0.08 |
| Example 2-63 | 175 | 105 | 0.50 | 241.432 | −981.791 | 981.791 | 0.08 |
| Example 2-64 | 200 | 105 | 0.50 | 350.582 | −1289.48 | 1289.48 | 0.07 |
| Example 2-65 | 25 | 120 | 0.87 | 10.1605 | −57.3501 | 57.3501 | 0.34 |
| Example 2-66 | 50 | 120 | 0.87 | 29.1265 | −136.643 | 136.643 | 0.28 |
| Example 2-67 | 75 | 120 | 0.87 | 74.073 | −357.38 | 357.38 | 0.16 |
| Example 2-68 | 100 | 120 | 0.87 | 133.365 | −661.947 | 661.947 | 0.12 |
| Example 2-69 | 125 | 120 | 0.87 | 136.452 | −655.09 | 655.09 | 0.15 |
| Example 2-70 | 150 | 120 | 0.87 | 297.667 | −1342.15 | 1342.15 | 0.09 |
| Example 2-71 | 175 | 120 | 0.87 | 351.385 | −1529.56 | 1529.56 | 0.09 |
| Example 2-72 | 200 | 120 | 0.87 | 486.754 | −1796 | 1796 | 0.09 |
| Example 2-73 | 25 | 135 | 1.00 | 12.016 | −51.161 | 51.161 | 0.43 |
| Example 2-74 | 50 | 135 | 1.00 | 30.7176 | −136.684 | 136.684 | 0.33 |
| Example 2-75 | 75 | 135 | 1.00 | 74.6721 | −368.175 | 368.175 | 0.18 |
| Example 2-76 | 100 | 135 | 1.00 | 142.527 | −695.904 | 695.904 | 0.13 |
| Example 2-77 | 125 | 135 | 1.00 | 233.812 | −1073.28 | 1073.28 | 0.10 |
| Example 2-78 | 150 | 135 | 1.00 | 309.784 | −1423.48 | 1423.48 | 0.09 |
| Example 2-79 | 175 | 135 | 1.00 | 403.784 | −1806.37 | 1806.37 | 0.09 |
| Example 2-80 | 200 | 135 | 1.00 | 545.072 | −1995.66 | 1995.66 | 0.09 |
| Example 2-81 | 25 | 150 | 0.87 | 9.68342 | −46.9737 | 46.9737 | 0.41 |
| Example 2-82 | 50 | 150 | 0.87 | 26.3462 | −110.558 | 110.558 | 0.35 |
| Example 2-83 | 75 | 150 | 0.87 | 63.2917 | −275.067 | 275.067 | 0.21 |
| Example 2-84 | 100 | 150 | 0.87 | 121.576 | −502.891 | 502.891 | 0.15 |
| Example 2-85 | 125 | 150 | 0.87 | 175.334 | −793.066 | 793.066 | 0.12 |
| Example 2-86 | 150 | 150 | 0.87 | 274.307 | −1201.31 | 1201.31 | 0.10 |
| Example 2-87 | 175 | 150 | 0.87 | 371.011 | −1444.21 | 1444.21 | 0.09 |
| Example 2-88 | 200 | 150 | 0.87 | 433.043 | −1554.62 | 1554.62 | 0.10 |
| Example 2-89 | 25 | 165 | 0.50 | 9.81558 | −33.4495 | 33.4495 | 0.33 |
| Example 2-90 | 50 | 165 | 0.50 | 17.268 | −66.056 | 66.056 | 0.34 |
| Example 2-91 | 75 | 165 | 0.50 | 34.6347 | −153.61 | 153.61 | 0.22 |
| Example 2-92 | 100 | 165 | 0.50 | 64.7832 | −273.244 | 273.244 | 0.16 |
| Example 2-93 | 125 | 165 | 0.50 | 125.247 | −509.581 | 509.581 | 0.11 |

TABLE 2-continued

| Particle (II) | Concentration (B) [μg/mL] | θ [°] | τ relative ratio (C) ($|\sin 2\theta|$) [θ = degree] | CD spectrum [mdeg] About @550 nm | CD spectrum [mdeg] About @630 nm | Pmax | (A * B * C)/Pmax (A = 50.2/56.3) |
|---|---|---|---|---|---|---|---|
| Example 2-94 | 150 | 165 | 0.50 | 171.555 | −721.413 | 721.413 | 0.09 |
| Example 2-95 | 175 | 165 | 0.50 | 228.764 | −870.148 | 870.148 | 0.09 |
| Example 2-96 | 200 | 165 | 0.50 | 268.001 | −915.525 | 915.525 | 0.10 |
| Maximum value of (A * B * C)/Pmax | | | | | | | 0.73 |
| Minimum value of (A * B * C)/Pmax | | | | | | | 0.00 |
| For C > 0, minimum value of (A * B * C)/Pmax | | | | | | | 0.06 |

TABLE 3

| Particle (III) | Concentration (B) [μg/mL] | θ [°] | τ relative ratio (C) ($|\sin 2\theta|$) [θ = degree] | CD spectrum [mdeg] About @560 nm | CD spectrum [mdeg] About @830 nm | Pmax | (A * B * C)/Pmax (A = 78/107) |
|---|---|---|---|---|---|---|---|
| Example 3-1 | 25 | 0 | 0.00 | −7.53815 | 9.50373 | 9.50373 | 0.00 |
| Example 3-2 | 50 | 0 | 0.00 | −11.5166 | 11.6856 | 11.6856 | 0.00 |
| Example 3-3 | 75 | 0 | 0.00 | −19.4045 | 13.333 | 19.4045 | 0.00 |
| Example 3-4 | 100 | 0 | 0.00 | −30.2261 | 13.0284 | 30.2261 | 0.00 |
| Example 3-5 | 125 | 0 | 0.00 | −27.3712 | 29.2251 | 29.2251 | 0.00 |
| Example 3-6 | 150 | 0 | 0.00 | −22.7016 | 38.9029 | 38.9029 | 0.00 |
| Example 3-7 | 175 | 0 | 0.00 | −19.079 | 34.1915 | 34.1915 | 0.00 |
| Example 3-8 | 200 | 0 | 0.00 | −26.3219 | 35.9554 | 35.9554 | 0.00 |
| Example 3-9 | 25 | 15 | 0.50 | −7.91551 | 7.68037 | 7.91551 | 1.15 |
| Example 3-10 | 50 | 15 | 0.50 | −15.8674 | −6.02037 | 15.8674 | 1.15 |
| Example 3-11 | 75 | 15 | 0.50 | −27.9142 | −19.1392 | 27.9142 | 0.98 |
| Example 3-12 | 100 | 15 | 0.50 | −39.4368 | −32.1212 | 39.4368 | 0.93 |
| Example 3-13 | 125 | 15 | 0.50 | −51.6815 | −47.6679 | 51.6815 | 0.88 |
| Example 3-14 | 150 | 15 | 0.50 | −57.5326 | −65.4931 | 65.4931 | 0.84 |
| Example 3-15 | 175 | 15 | 0.50 | −70.7813 | −100.152 | 100.152 | 0.64 |
| Example 3-16 | 200 | 15 | 0.50 | −65.7547 | −115.026 | 115.026 | 0.63 |
| Example 3-17 | 25 | 30 | 0.87 | −9.4047 | 0.259422 | 9.4047 | 1.68 |
| Example 3-18 | 50 | 30 | 0.87 | −20.5545 | −14.4674 | 20.5545 | 1.54 |
| Example 3-19 | 75 | 30 | 0.87 | −35.1782 | −35.3682 | 35.3682 | 1.34 |
| Example 3-20 | 100 | 30 | 0.87 | −54.9278 | −64.9022 | 64.9022 | 0.97 |
| Example 3-21 | 125 | 30 | 0.87 | −70.683 | −103.213 | 103.213 | 0.77 |
| Example 3-22 | 150 | 30 | 0.87 | −80.7226 | −139.911 | 139.911 | 0.68 |
| Example 3-23 | 175 | 30 | 0.87 | −84.4237 | −184.024 | 184.024 | 0.60 |
| Example 3-24 | 200 | 30 | 0.87 | −105.777 | −236.778 | 236.778 | 0.53 |

TABLE 3-continued

| Particle (III) | Concentration (B) [μg/mL] | θ [°] | τ relative ratio (C) (\|sin2θ\|) [θ = degree] | CD spectrum [mdeg] | | | (A * B * C)/Pmax (A = 78/107) |
|---|---|---|---|---|---|---|---|
| | | | | About @560 nm | About @830 nm | Pmax | |
| Example 3-25 | 25 | 45 | 1.00 | −8.93725 | 1.29636 | 8.93725 | 2.04 |
| Example 3-26 | 50 | 45 | 1.00 | −23.0299 | −13.2333 | 23.0299 | 1.58 |
| Example 3-27 | 75 | 45 | 1.00 | −37.3763 | −40.461 | 40.461 | 1.35 |
| Example 3-28 | 100 | 45 | 1.00 | −59.3599 | −80.2965 | 80.2965 | 0.91 |
| Example 3-29 | 125 | 45 | 1.00 | −74.4613 | −114.102 | 114.102 | 0.80 |
| Example 3-30 | 150 | 45 | 1.00 | −93.3701 | −167.345 | 167.345 | 0.65 |
| Example 3-31 | 175 | 45 | 1.00 | −93.1886 | −216.908 | 216.908 | 0.59 |
| Example 3-32 | 200 | 45 | 1.00 | −109.779 | −263.285 | 263.285 | 0.55 |
| Example 3-33 | 25 | 60 | 0.87 | −6.4495 | 2.78366 | 6.4495 | 2.45 |
| Example 3-34 | 50 | 60 | 0.87 | −14.6077 | −12.3136 | 14.6077 | 2.16 |
| Example 3-35 | 75 | 60 | 0.87 | −29.8128 | −33.7258 | 33.7258 | 1.41 |
| Example 3-36 | 100 | 60 | 0.87 | −49.5093 | −60.2401 | 60.2401 | 1.05 |
| Example 3-37 | 125 | 60 | 0.87 | −63.1746 | −96.4258 | 96.4258 | 0.82 |
| Example 3-38 | 150 | 60 | 0.87 | −82.6834 | −146.269 | 146.269 | 0.65 |
| Example 3-39 | 175 | 60 | 0.87 | −76.156 | −176.352 | 176.352 | 0.63 |
| Example 3-40 | 200 | 60 | 0.87 | −74.7141 | −206.697 | 206.697 | 0.61 |
| Example 3-41 | 25 | 75 | 0.50 | −6.55073 | 5.32714 | 6.55073 | 1.39 |
| Example 3-42 | 50 | 75 | 0.50 | −18.8469 | −5.32564 | 18.8469 | 0.97 |
| Example 3-43 | 75 | 75 | 0.50 | −21.2838 | −15.4706 | 21.2838 | 1.29 |
| Example 3-44 | 100 | 75 | 0.50 | −33.7699 | −28.8007 | 33.7699 | 1.08 |
| Example 3-45 | 125 | 75 | 0.50 | −36.9541 | −46.3082 | 46.3082 | 0.99 |
| Example 3-46 | 150 | 75 | 0.50 | −48.4698 | −71.9071 | 71.9071 | 0.76 |
| Example 3-47 | 175 | 75 | 0.50 | −54.8074 | −93.9875 | 93.9875 | 0.68 |
| Example 3-48 | 200 | 75 | 0.50 | −60.9551 | −114.5 | 114.5 | 0.64 |
| Example 3-49 | 25 | 90 | 0.00 | −8.21705 | 5.6958 | 8.21705 | 0.00 |
| Example 3-50 | 50 | 90 | 0.00 | −14.5284 | 4.16412 | 14.5284 | 0.00 |
| Example 3-51 | 75 | 90 | 0.00 | −19.2898 | 4.08091 | 19.2898 | 0.00 |
| Example 3-52 | 100 | 90 | 0.00 | −18.027 | 12.6545 | 18.027 | 0.00 |
| Example 3-53 | 125 | 90 | 0.00 | −21.2254 | 24.8205 | 24.8205 | 0.00 |
| Example 3-54 | 150 | 90 | 0.00 | −15.3822 | 22.9 | 22.9 | 0.00 |
| Example 3-55 | 175 | 90 | 0.00 | −24.9115 | 20.5429 | 24.9115 | 0.00 |
| Example 3-56 | 200 | 90 | 0.00 | −23.7274 | 23.832 | 23.832 | 0.00 |
| Example 3-57 | 25 | 105 | 0.50 | −2.01906 | 8.26742 | 8.26742 | 1.10 |
| Example 3-58 | 50 | 105 | 0.50 | −4.33768 | 14.8651 | 14.8651 | 1.23 |
| Example 3-59 | 75 | 105 | 0.50 | −9.37984 | 28.0946 | 28.0946 | 0.97 |
| Example 3-60 | 100 | 105 | 0.50 | −10.9829 | 52.7525 | 52.7525 | 0.69 |
| Example 3-61 | 125 | 105 | 0.50 | −5.55637 | 77.838 | 77.838 | 0.59 |

TABLE 3-continued

| Particle (III) | Concentration (B) [μg/mL] | θ [°] | τ relative ratio (C) (\|sin2θ\|) [θ = degree] | CD spectrum [mdeg] | | | (A * B * C)/Pmax (A = 78/107) |
|---|---|---|---|---|---|---|---|
| | | | | About @560 nm | About @830 nm | Pmax | |
| Example 3-62 | 150 | 105 | 0.50 | 2.34774 | 108.448 | 108.448 | 0.50 |
| Example 3-63 | 175 | 105 | 0.50 | −3.44082 | 129.594 | 129.594 | 0.49 |
| Example 3-64 | 200 | 105 | 0.50 | −1.00455 | 149.064 | 149.064 | 0.49 |
| Example 3-65 | 25 | 120 | 0.87 | −6.74832 | 8.49235 | 8.49235 | 1.86 |
| Example 3-66 | 50 | 120 | 0.87 | −3.26899 | 19.614 | 19.614 | 1.61 |
| Example 3-67 | 75 | 120 | 0.87 | −1.63751 | 42.1399 | 42.1399 | 1.13 |
| Example 3-68 | 100 | 120 | 0.87 | 8.42136 | 87.5046 | 87.5046 | 0.72 |
| Example 3-69 | 125 | 120 | 0.87 | 17.7691 | 125.622 | 125.622 | 0.63 |
| Example 3-70 | 150 | 120 | 0.87 | 29.9982 | 180.58 | 180.58 | 0.53 |
| Example 3-71 | 175 | 120 | 0.87 | 18.6498 | 204.748 | 204.748 | 0.54 |
| Example 3-72 | 200 | 120 | 0.87 | 42.3768 | 244.464 | 244.464 | 0.52 |
| Example 3-73 | 25 | 135 | 1.00 | −4.69228 | 8.02431 | 8.02431 | 2.27 |
| Example 3-74 | 50 | 135 | 1.00 | −7.01615 | 15.3894 | 15.3894 | 2.37 |
| Example 3-75 | 75 | 135 | 1.00 | 1.10383 | 51.6208 | 51.6208 | 1.06 |
| Example 3-76 | 100 | 135 | 1.00 | 9.99771 | 90.5506 | 90.5506 | 0.81 |
| Example 3-77 | 125 | 135 | 1.00 | 19.9972 | 135.318 | 135.318 | 0.67 |
| Example 3-78 | 150 | 135 | 1.00 | 26.0874 | 195.643 | 195.643 | 0.56 |
| Example 3-79 | 175 | 135 | 1.00 | 39.5219 | 234.553 | 234.553 | 0.54 |
| Example 3-80 | 200 | 135 | 1.00 | 38.8694 | 293.858 | 293.858 | 0.50 |
| Example 3-81 | 25 | 150 | 0.87 | −6.71394 | 6.86092 | 6.86092 | 2.30 |
| Example 3-82 | 50 | 150 | 0.87 | −4.00949 | 12.8799 | 12.8799 | 2.45 |
| Example 3-83 | 75 | 150 | 0.87 | −2.05087 | 42.0491 | 42.0491 | 1.13 |
| Example 3-84 | 100 | 150 | 0.87 | 2.5425 | 78.2846 | 78.2846 | 0.81 |
| Example 3-85 | 125 | 150 | 0.87 | 17.0064 | 134.022 | 134.022 | 0.59 |
| Example 3-86 | 150 | 150 | 0.87 | 15.4648 | 176.807 | 176.807 | 0.54 |
| Example 3-87 | 175 | 150 | 0.87 | 39.1618 | 219.53 | 219.53 | 0.50 |
| Example 3-88 | 200 | 150 | 0.87 | 35.0033 | 270.308 | 270.308 | 0.47 |
| Example 3-89 | 25 | 165 | 0.50 | −2.72344 | 3.83548 | 3.83548 | 2.38 |
| Example 3-90 | 50 | 165 | 0.50 | −6.24092 | 6.95336 | 6.95336 | 2.62 |
| Example 3-91 | 75 | 165 | 0.50 | −0.576269 | 24.7738 | 24.7738 | 1.10 |
| Example 3-92 | 100 | 165 | 0.50 | −6.19691 | 59.9633 | 59.9633 | 0.61 |
| Example 3-93 | 125 | 165 | 0.50 | 2.06396 | 91.3203 | 91.3203 | 0.50 |
| Example 3-94 | 150 | 165 | 0.50 | 9.68981 | 99.0606 | 99.0606 | 0.55 |
| Example 3-95 | 175 | 165 | 0.50 | 7.16727 | 136.52 | 136.52 | 0.47 |
| Example 3-96 | 200 | 165 | 0.50 | 8.96223 | 157.629 | 157.629 | 0.46 |
| Maximum value of (A * B * C)/Pmax | | | | | | | 2.62 |
| Minimum value of (A * B * C)/Pmax | | | | | | | 0.00 |
| For C > 0, minimum value of (A * B * C)/Pmax | | | | | | | 0.46 |

TABLE 4

| Particle (IV) | Concentration (B) [µg/mL] | θ [°] | τ relative ratio (C) (\|sin2θ\|) [θ = degree] | CD spectrum [mdeg] About @450 nm | About @700 nm | Pmax | (A * B * C)/Pmax (A = 204.6/22.8) |
|---|---|---|---|---|---|---|---|
| Example 4-1 | 25 | 0 | 0.00 | −13.7293 | −9.37537 | 13.7293 | 0.00 |
| Example 4-2 | 50 | 0 | 0.00 | −26.8003 | −19.6424 | 26.8003 | 0.00 |
| Example 4-3 | 75 | 0 | 0.00 | −40.3599 | −27.4027 | 40.3599 | 0.00 |
| Example 4-4 | 100 | 0 | 0.00 | −61.3673 | −49.9827 | 61.3673 | 0.00 |
| Example 4-5 | 125 | 0 | 0.00 | −64.7302 | −63.3074 | 64.7302 | 0.00 |
| Example 4-6 | 150 | 0 | 0.00 | −82.6592 | −71.9333 | 82.6592 | 0.00 |
| Example 4-7 | 175 | 0 | 0.00 | −78.9345 | −97.0621 | 97.0621 | 0.00 |
| Example 4-8 | 200 | 0 | 0.00 | −82.7787 | −80.4553 | 82.7787 | 0.00 |
| Example 4-9 | 25 | 15 | 0.50 | −11.437 | −6.12388 | 11.437 | 9.80 |
| Example 4-10 | 50 | 15 | 0.50 | −0.387778 | −28.7961 | 28.7961 | 7.79 |
| Example 4-11 | 75 | 15 | 0.50 | 8.87803 | −38.657 | 38.657 | 8.70 |
| Example 4-12 | 100 | 15 | 0.50 | 14.8943 | −64.7364 | 64.7364 | 6.93 |
| Example 4-13 | 125 | 15 | 0.50 | 27.2106 | −113.701 | 113.701 | 4.93 |
| Example 4-14 | 150 | 15 | 0.50 | 32.7927 | −126.945 | 126.945 | 5.30 |
| Example 4-15 | 175 | 15 | 0.50 | 41.7736 | −163.453 | 163.453 | 4.80 |
| Example 4-16 | 200 | 15 | 0.50 | 81.4048 | −197.244 | 197.244 | 4.55 |
| Example 4-17 | 25 | 30 | 0.87 | −11.437 | −6.12388 | 11.437 | 16.98 |
| Example 4-18 | 50 | 30 | 0.87 | 9.05278 | −30.7624 | 30.7624 | 12.63 |
| Example 4-19 | 75 | 30 | 0.87 | 39.1174 | −56.1303 | 56.1303 | 10.38 |
| Example 4-20 | 100 | 30 | 0.87 | 79.4493 | −82.8562 | 82.8562 | 9.38 |
| Example 4-21 | 125 | 30 | 0.87 | 97.5773 | −137.605 | 137.605 | 7.06 |
| Example 4-22 | 150 | 30 | 0.87 | 129.521 | −176.785 | 176.785 | 6.59 |
| Example 4-23 | 175 | 30 | 0.87 | 173.356 | −212.988 | 212.988 | 6.38 |
| Example 4-24 | 200 | 30 | 0.87 | 179.851 | −248.184 | 248.184 | 6.26 |
| Example 4-25 | 25 | 45 | 1.00 | −3.60336 | −13.2538 | 13.2538 | 16.92 |
| Example 4-26 | 50 | 45 | 1.00 | 20.658 | −37.4083 | 37.4083 | 11.99 |
| Example 4-27 | 75 | 45 | 1.00 | 50.3629 | −60.2882 | 60.2882 | 11.16 |
| Example 4-28 | 100 | 45 | 1.00 | 88.9416 | −95.797 | 95.797 | 9.36 |
| Example 4-29 | 125 | 45 | 1.00 | 127.573 | −159.375 | 159.375 | 7.04 |
| Example 4-30 | 150 | 45 | 1.00 | 148.764 | −202.892 | 202.892 | 6.63 |
| Example 4-31 | 175 | 45 | 1.00 | 164.48 | −244.317 | 244.317 | 6.43 |
| Example 4-32 | 200 | 45 | 1.00 | 177.76 | −275.326 | 275.326 | 6.52 |
| Example 4-33 | 25 | 60 | 0.87 | −8.39113 | −13.7004 | 13.7004 | 14.18 |
| Example 4-34 | 50 | 60 | 0.87 | 12.5795 | −38.8445 | 38.8445 | 10.00 |
| Example 4-35 | 75 | 60 | 0.87 | 46.6445 | −54.6695 | 54.6695 | 10.66 |
| Example 4-36 | 100 | 60 | 0.87 | 78.3133 | −98.3385 | 98.3385 | 7.90 |
| Example 4-37 | 125 | 60 | 0.87 | 100.229 | −136.854 | 136.854 | 7.10 |

TABLE 4-continued

| Particle (IV) | Concentration (B) [μg/mL] | θ [°] | τ relative ratio (C) (\|sin2θ\|) [θ = degree] | CD spectrum [mdeg] About @450 nm | About @700 nm | Pmax | (A * B * C)/Pmax (A = 204.6/22.8) |
|---|---|---|---|---|---|---|---|
| Example 4-38 | 150 | 60 | 0.87 | 136 | −196.026 | 196.026 | 5.94 |
| Example 4-39 | 175 | 60 | 0.87 | 152.98 | −239.44 | 239.44 | 5.68 |
| Example 4-40 | 200 | 60 | 0.87 | 174.774 | −258.659 | 258.659 | 6.01 |
| Example 4-41 | 25 | 75 | 0.50 | −13.1136 | −11.9487 | 13.1136 | 8.55 |
| Example 4-42 | 50 | 75 | 0.50 | −2.90439 | −25.3031 | 25.3031 | 8.86 |
| Example 4-43 | 75 | 75 | 0.50 | 14.0841 | −46.955 | 46.955 | 7.16 |
| Example 4-44 | 100 | 75 | 0.50 | 25.5531 | −65.2249 | 65.2249 | 6.88 |
| Example 4-45 | 125 | 75 | 0.50 | 32.7731 | −110.369 | 110.369 | 5.08 |
| Example 4-46 | 150 | 75 | 0.50 | 38.7656 | −150.619 | 150.619 | 4.47 |
| Example 4-47 | 175 | 75 | 0.50 | 68.8032 | −167.151 | 167.151 | 4.70 |
| Example 4-48 | 200 | 75 | 0.50 | 80.1045 | −181.408 | 181.408 | 4.94 |
| Example 4-49 | 25 | 90 | 0.00 | −13.6779 | −11.4838 | 13.6779 | 0.00 |
| Example 4-50 | 50 | 90 | 0.00 | −31.6212 | −20.6161 | 31.6212 | 0.00 |
| Example 4-51 | 75 | 90 | 0.00 | −41.8544 | −23.6395 | 41.8544 | 0.00 |
| Example 4-52 | 100 | 90 | 0.00 | −41.9537 | −31.529 | 41.9537 | 0.00 |
| Example 4-53 | 125 | 90 | 0.00 | −89.1371 | −56.5824 | 89.1371 | 0.00 |
| Example 4-54 | 150 | 90 | 0.00 | −74.274 | −77.7345 | 77.7345 | 0.00 |
| Example 4-55 | 175 | 90 | 0.00 | −133.742 | −62.0819 | 133.742 | 0.00 |
| Example 4-56 | 200 | 90 | 0.00 | −87.9446 | −50.7764 | 87.9446 | 0.00 |
| Example 4-57 | 25 | 105 | 0.50 | −24.9615 | −2.0642 | 24.9615 | 4.49 |
| Example 4-58 | 50 | 105 | 0.50 | −53.6922 | −7.2385 | 53.6922 | 4.18 |
| Example 4-59 | 75 | 105 | 0.50 | −81.738 | −9.26416 | 81.738 | 4.12 |
| Example 4-60 | 100 | 105 | 0.50 | −129.965 | 0.163201 | 129.965 | 3.45 |
| Example 4-61 | 125 | 105 | 0.50 | −191.557 | 5.12119 | 191.557 | 2.93 |
| Example 4-62 | 150 | 105 | 0.50 | −229.336 | −11.7384 | 229.336 | 2.93 |
| Example 4-63 | 175 | 105 | 0.50 | −239.939 | 22.9567 | 239.939 | 3.27 |
| Example 4-64 | 200 | 105 | 0.50 | −241.141 | 52.4878 | 241.141 | 3.72 |
| Example 4-65 | 25 | 120 | 0.87 | −30.2692 | −0.84840 | 30.2692 | 6.42 |
| Example 4-66 | 50 | 120 | 0.87 | −76.1418 | −0.62602 | 76.1418 | 5.10 |
| Example 4-67 | 75 | 120 | 0.87 | −128.125 | 3.04504 | 128.125 | 4.55 |
| Example 4-68 | 100 | 120 | 0.87 | −163.733 | 16.9155 | 163.733 | 4.74 |
| Example 4-69 | 125 | 120 | 0.87 | −244.645 | 36.2708 | 244.645 | 3.97 |
| Example 4-70 | 150 | 120 | 0.87 | −328.532 | 47.1086 | 328.532 | 3.55 |
| Example 4-71 | 175 | 120 | 0.87 | −336.89 | 100.448 | 336.89 | 4.04 |
| Example 4-72 | 200 | 120 | 0.87 | −346.413 | 119.458 | 346.413 | 4.48 |
| Example 4-73 | 25 | 135 | 1.00 | −30.1818 | −0.43374 | 30.1818 | 7.43 |
| Example 4-74 | 50 | 135 | 1.00 | −77.7811 | 0.402123 | 77.7811 | 5.77 |

TABLE 4-continued

| Particle (IV) | Concentration (B) [μg/mL] | θ [°] | τ relative ratio (C) ($|\sin2\theta|$) [θ = degree] | CD spectrum [mdeg] About @450 nm | About @700 nm | Pmax | (A * B * C)/Pmax (A = 204.6/22.8) |
|---|---|---|---|---|---|---|---|
| Example 4-75 | 75 | 135 | 1.00 | −138.074 | 6.51752 | 138.074 | 4.87 |
| Example 4-76 | 100 | 135 | 1.00 | −208.923 | 25.7691 | 208.923 | 4.29 |
| Example 4-77 | 125 | 135 | 1.00 | −276.945 | 39.2789 | 276.945 | 4.05 |
| Example 4-78 | 150 | 135 | 1.00 | −331.597 | 56.2207 | 331.597 | 4.06 |
| Example 4-79 | 175 | 135 | 1.00 | −351.074 | 127.933 | 351.074 | 4.47 |
| Example 4-80 | 200 | 135 | 1.00 | −466.984 | 168.866 | 466.984 | 3.84 |
| Example 4-81 | 25 | 150 | 0.87 | −28.4136 | −2.24077 | 28.4136 | 6.83 |
| Example 4-82 | 50 | 150 | 0.87 | −76.1401 | −0.08146 | 76.1401 | 5.10 |
| Example 4-83 | 75 | 150 | 0.87 | −117.67 | 2.83803 | 117.67 | 4.95 |
| Example 4-84 | 100 | 150 | 0.87 | −179.737 | 12.7147 | 179.737 | 4.32 |
| Example 4-85 | 125 | 150 | 0.87 | −233.904 | 31.5423 | 233.904 | 4.15 |
| Example 4-86 | 150 | 150 | 0.87 | −311.735 | 39.6801 | 311.735 | 3.74 |
| Example 4-87 | 175 | 150 | 0.87 | −323.65 | 94.0516 | 323.65 | 4.20 |
| Example 4-88 | 200 | 150 | 0.87 | −326.197 | 120.249 | 326.197 | 4.76 |
| Example 4-89 | 25 | 165 | 0.50 | −25.1369 | −5.97778 | 25.1369 | 4.46 |
| Example 4-90 | 50 | 165 | 0.50 | −54.1712 | −8.91204 | 54.1712 | 4.14 |
| Example 4-91 | 75 | 165 | 0.50 | −85.2771 | −16.5045 | 85.2771 | 3.94 |
| Example 4-92 | 100 | 165 | 0.50 | −112.405 | −7.10573 | 112.405 | 3.99 |
| Example 4-93 | 125 | 165 | 0.50 | −172.165 | −9.25674 | 172.165 | 3.26 |
| Example 4-94 | 150 | 165 | 0.50 | −204.38 | −15.8375 | 204.38 | 3.29 |
| Example 4-95 | 175 | 165 | 0.50 | −226.903 | 14.977 | 226.903 | 3.46 |
| Example 4-96 | 200 | 165 | 0.50 | −262.556 | 26.2862 | 262.556 | 3.42 |
| Maximum value of (A * B * C)/Pmax | | | | | | | 16.98 |
| Minimum value of (A * B * C)/Pmax | | | | | | | 0.00 |
| For C > 0, minimum value of (A * B * C)/Pmax | | | | | | | 2.93 |

Referring to Measurement Examples 1 to 2 and Tables 1 to 4, it could be confirmed that the magnetoplasmonic particles in Examples 1 to 4 had the characteristics that the arrangement was changed according to the application of the magnetic field.

Furthermore, it could be confirmed that each of the nano-structures manufactured based on the arrangement variability due to the application of the magnetic field to the magnetoplasmonic particle had the structural chirality by themselves by receiving the chirality of the magnetic field.

More specifically, it could be confirmed that the magnetoplasmonic particles in Examples 1 and 2 included the spherical core-shell particle and had the structure in which the shell substantially surrounded the surface of the core, and the value of Equation 1 of the nano-structure to which the structure was applied satisfied about 0.01 to about 1.0.

In addition, it could be confirmed that the magnetoplasmonic particle in Example 3 included the rod-shaped core-shell particle and had the structure in which the shell substantially surrounded the surface of the core, and the value of Equation 1 of the nano-structure to which the structure was applied satisfied about 0.3 to about 3.0.

In addition, it could be confirmed that the magnetoplasmonic particle in Example 4 included the spherical core-shell particle and had the half-shell structure in which the shell substantially surrounded a part of the surface of the core, and the value of Equation 1 of the nano-structure to which the structure was applied satisfied about 0.01 to about 20.

As described above, the magnetoplasmonic particles can have the core-shell structure and have the arrangement variability due to the application of the magnetic field, thereby forming the nano-structure having the aligned structure corresponding to the structure, the intensity, etc. of the applied magnetic field. As one embodiment, it could be confirmed that when the magnetic field was the magnetic field of the spiral structure having chirality, the structural arrangement of the magnetoplasmonic particle was changed to correspond to the magnetic field to serve as one configuration of the nano-structure having chirality in the overall structure. This magnetoplasmonic particle can not only have the fast reaction rate to the application of the magnetic field, but also serve to improve structural precision when being manufactured as the nano-structure, thereby implementing the effect of securing broad applicability in various technical fields.

INDUSTRIAL APPLICABILITY

The nano-structure according to the present disclosure can serve to improve the structural precision, thereby implementing the effect of securing broad applicability in various technical fields.

The invention claimed is:

1. A magnetoplasmonic particle comprising:
a core-shell particle comprising:
a core; and
a shell surrounding at least a portion of a surface of the core, and comprising a component different from a component of the core,
wherein the magnetoplasmonic particle exhibits arrangement variability in response to an applied magnetic field,
wherein the core-shell particle has a particle diameter standard deviation of 30 nm or less for a 1 mg powder sample,
wherein a particle arrangement structure is formed by rearrangement of the magnetoplasmonic particles in response to a spiral magnetic field, and wherein a nano-structure comprising at least one of the particle arrangement structures exhibits chirality in the overall structure, wherein the core-shell particle is a spherical core-shell particle, having a diameter of the core of 0.01 nm to 300 nm, a thickness of the shell of 1 nm to 150 nm, and an aspect ratio of 1.00 to 2.00 defined as a ratio (L/S) of a long diameter (L) and a short diameter (S) of the core.

2. The magnetoplasmonic particle of claim 1, wherein for the core-shell particle, any one of the core and the shell comprises a magnetic component, and the other comprises a metal component.

3. The magnetoplasmonic particle of claim 2, wherein the magnetic component comprises one selected from the group consisting of iron oxide ($Fe_3O_4$), nickel oxide (NiO), cobalt oxide ($Co_3O_4$), iron (Fe), nickel (Ni), cobalt (Co), and combinations thereof.

4. The magnetoplasmonic particle of claim 2, wherein the metal component comprises one selected from the group consisting of silver (Ag), gold (Au), platinum (Pt), copper (Cu), palladium (Pd), iridium, osmium, rhodium, ruthenium, nickel (Ni), cobalt (Co), iron (Fe), manganese (Mn), chromium (Cr), vanadium (V), titanium (Ti), aluminum (Al), zinc (Zn), cadmium (Cd) and combinations thereof.

5. The magnetoplasmonic particle of claim 1, wherein the arrangement variability due to the application of the magnetic field comprises arrangement variability due to the application of a spiral magnetic field.

* * * * *